US009002826B2

(12) United States Patent
Rabii

(10) Patent No.: US 9,002,826 B2
(45) Date of Patent: Apr. 7, 2015

(54) MEDIA FILE CACHING FOR AN ELECTRONIC DEVICE TO CONSERVE RESOURCES

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 12/912,901

(22) Filed: Oct. 27, 2010

(65) Prior Publication Data

US 2012/0110036 A1 May 3, 2012

(51) Int. Cl.
G06F 17/30 (2006.01)
H04N 21/433 (2011.01)
H04N 21/414 (2011.01)
H04N 21/4402 (2011.01)
H04N 21/442 (2011.01)
H04N 21/443 (2011.01)
H04N 21/41 (2011.01)
H04N 21/61 (2011.01)

(52) U.S. Cl.
CPC ........ *H04N 21/4331* (2013.01); *H04N 21/4135* (2013.01); *H04N 21/41407* (2013.01); *H04N 21/4332* (2013.01); *H04N 21/440218* (2013.01); *H04N 21/44204* (2013.01); *H04N 21/4436* (2013.01); *H04N 21/6125* (2013.01); *H04N 21/6131* (2013.01)

(58) Field of Classification Search
USPC .......................... 707/719, 720, 727; 709/218
See application file for complete search history.

(56) References Cited

U.S. PATENT DOCUMENTS

| 6,341,304 | B1  |   | 1/2002  | Engbersen et al.           |
|-----------|-----|---|---------|----------------------------|
| 6,725,421 | B1  | * | 4/2004  | Boucher et al. ..... 715/205 |
| 6,745,368 | B1  |   | 6/2004  | Boucher et al.             |
| 6,959,436 | B2  |   | 10/2005 | Peng                       |
| 8,175,584 | B2  | * | 5/2012  | Estevez et al. ..... 455/414.1 |
| 2002/0087797 | A1 | * | 7/2002  | Adrangi ..... 711/133      |
| 2002/0176506 | A1 | * | 11/2002 | Ferreira Florencio et al. ..... 375/240.25 |
| 2003/0028673 | A1 |   | 2/2003  | Lin et al.                 |
| 2003/0065743 | A1 | * | 4/2003  | Jenny et al. ..... 709/219  |
| 2004/0098463 | A1 |   | 5/2004  | Shen et al.                |
| 2004/0193659 | A1 |   | 9/2004  | Carlson et al.             |
| 2006/0069746 | A1 | * | 3/2006  | Davis et al. ..... 709/218  |
| 2006/0253608 | A1 | * | 11/2006 | Reynolds et al. ..... 709/245 |
| 2007/0055643 | A1 |   | 3/2007  | Iwatsu et al.              |
| 2008/0059886 | A1 |   | 3/2008  | Grossman                   |

(Continued)

FOREIGN PATENT DOCUMENTS

EP 1669878 A1 6/2006
JP 2000066844 A 3/2000

(Continued)

OTHER PUBLICATIONS

International Search Repoort and Written Opinion—PCT/US2011/057553—ISA/EPO—Jan. 31, 2012.

*Primary Examiner* — Etienne Leroux
*Assistant Examiner* — Cindy Nguyen
(74) *Attorney, Agent, or Firm* — Brent A. Boyd

(57) ABSTRACT

An electronic device for media file caching for conserving resources is described. The electronic device includes a processor and instructions stored in memory. The electronic device monitors requests for a media file, stores media file information and determines whether the media file should be stored locally based on the media file information. If it is determined that the media file should be stored, the electronic device saves the media file and presents the media file.

44 Claims, 13 Drawing Sheets

(56) References Cited

U.S. PATENT DOCUMENTS

| | | |
|---|---|---|
| 2008/0133546 A1* | 6/2008 | Phillips .......................... 707/10 |
| 2008/0195698 A1 | 8/2008 | Stefanovic et al. |
| 2008/0227440 A1 | 9/2008 | Settepalli |
| 2009/0007188 A1* | 1/2009 | Omernick ...................... 725/62 |
| 2009/0055467 A1 | 2/2009 | Petersen |
| 2009/0083279 A1* | 3/2009 | Hasek ............................ 707/10 |
| 2009/0193338 A1 | 7/2009 | Fiatal |
| 2010/0017516 A1* | 1/2010 | Sparrell et al. ................ 709/226 |
| 2010/0088330 A1* | 4/2010 | Komiya ........................ 707/758 |

FOREIGN PATENT DOCUMENTS

| | | |
|---|---|---|
| JP | 2004508605 A | 3/2004 |
| JP | 2010518509 A | 5/2010 |
| KR | 20060085910 A | 7/2006 |
| WO | WO-2005033952 A1 | 4/2005 |
| WO | WO-2006100345 A2 | 8/2008 |

* cited by examiner

| Media File Formats 762 | Native Format A 764a | | Native Format B 764b | | ... | Native Format N 764n | |
|---|---|---|---|---|---|---|---|
| Format A 762a | Transcoding Cost AA 766aa | Native Decoding Cost AA 768aa | Transcoding Cost AB 766ab | Native Decoding Cost AB 768ab | ... | Transcoding Cost AN 766an | Native Decoding Cost AN 768an |
| Format B 762b | Transcoding Cost BA 766ba | Native Decoding Cost BA 768ba | Transcoding Cost BB 766bb | Native Decoding Cost BB 768bb | ... | Transcoding Cost BN 766bn | Native Decoding Cost BN 768bn |
| ... | ... | | ... | | ... | ... | |
| Format N 762n | Transcoding Cost NA 766na | Native Decoding Cost NA 768na | Transcoding Cost NB 766nb | Native Decoding Cost NB 768nb | ... | Transcoding Cost NN 766nn | Native Decoding Cost NN 768nn |

FIG. 7

| Media File Information 836 | Media File A 820a | Media File B 820b | ... | Media File N 820n |
|---|---|---|---|---|
| Number of Requests 846 | 846a | 846b | | 846n |
| Request Times 848 | 848a | 848b | | 848n |
| File Size 870 | 870a | 870b | | 870n |
| File Format 872 | 872a | 872b | | 872n |
| Decoding Cost 874 | 874a | 874b | | 874n |
| Transcoding Cost 866 | 866a | 866b | | 866n |
| Native Decoding Cost 868 | 868a | 868b | | 868n |
| Count Threshold 838 | 838a | 838b | | 838n |
| Rate Threshold 840 | 840a | 840b | | 840n |
| File Address 842 | 842a | 842b | | 842n |
| File Name 844 | 844a | 844b | | 844n |
| File Type 876 | 876a | 876b | | 876n |
| Metadata 878 | 878a | 878b | | 878n |
| Other Information 850 | 850a | 850b | | 850n |

FIG. 8

MEDIA FILE CACHING FOR AN ELECTRONIC DEVICE TO CONSERVE RESOURCES

TECHNICAL FIELD

The present disclosure relates generally to electronic devices. More specifically, the present disclosure relates to media file caching for conserving resources.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Recently, the use of networks has also greatly increased. Many electronic devices obtain data using such networks. For example, many electronic devices download or stream data from other electronic devices connected to a network. For instance, an electronic device might download a file from a remote server using the Internet. Some electronic devices obtain data using a wireless connection to a network, such as wireless communication devices. Other electronic devices such as personal computers may use a wired connection to a network.

The increased use of electronic devices and networks has led to greater data access. Many users of electronic devices and networks frequently access data across the network. In fact, some users use electronic devices and networks to repeatedly access the same or similar data on the network. Repeatedly accessing the same or similar data on the network may be inefficient, consuming a relatively large amount of electronic device and network resources. As this discussion illustrates, improved systems and methods for reducing data access inefficiencies may be beneficial.

SUMMARY

An electronic device for media file caching for conserving resources is disclosed. The electronic device includes a processor and instructions stored in memory. The electronic device monitors requests for a media file, stores media file information and determines whether the media file should be stored locally based on the media file information. If it is determined that the media file should be stored, the electronic device saves the media file and presents the media file.

The media file may be saved in a native format. Determining whether the media file should be stored locally may be based on a number of requests. Determining whether the media file should be stored locally may be based on an original format decoding cost. Determining whether the media file should be stored locally may be based on a native format decoding cost. Determining whether the media file should be stored locally may be based on a transcoding cost.

The electronic device may also detect subsequent requests for the media file and may present the media file in a native format when subsequent requests for the media file are detected. The media file may be saved in local memory on the electronic device. The media file may be saved in local memory on another electronic device in a local network.

Saving the media file may include transcoding the media file from an original format into the native format. The electronic device may also determine a count threshold. It may be determined that the media file should be stored if a request count is greater than or equal to a count threshold. It may be determined that the media file should be stored if a request rate is greater than or equal to a rate threshold. The media file may include one or more media streams.

The electronic device may be a wireless communication device. The media file may be presented in the native format. The media file may be presented in an original format.

A method for media file caching for conserving resources on an electronic device is also disclosed. The method includes monitoring requests for a media file, storing media file information and determining whether the media file should be stored locally based on the media file information. If it is determined that the media file should be stored, the method includes saving the media file and presenting the media file on the electronic device.

A computer-program product for media file caching for conserving resources is also disclosed. The computer-program product includes a non-transitory computer-readable medium with instructions. The instructions include code for causing an electronic device to monitor requests for a media file, store media file information and determine whether the media file should be stored locally based on the media file information. The instructions include code that if it is determined that the media file should be stored, causes the electronic device to save the media file and present the media file.

An apparatus for media file caching for conserving resources is also disclosed. The apparatus includes means for monitoring requests for a media file, means for storing media file information and means for determining whether the media file should be stored locally based on the media file information. The apparatus also includes means that if it is determined that the media file should be stored, for saving the media file and presenting the media file.

BRIEF DESCRIPTION OF THE DRAWINGS

FIG. 7 is a diagram illustrating an example of information that may be used by an electronic device to determine a native format;

FIG. 8 is a diagram illustrating one example of media file information that may be used by an electronic device to determine whether to store a media file as a native format media file in a local memory cache;

DETAILED DESCRIPTION

Figure 1:
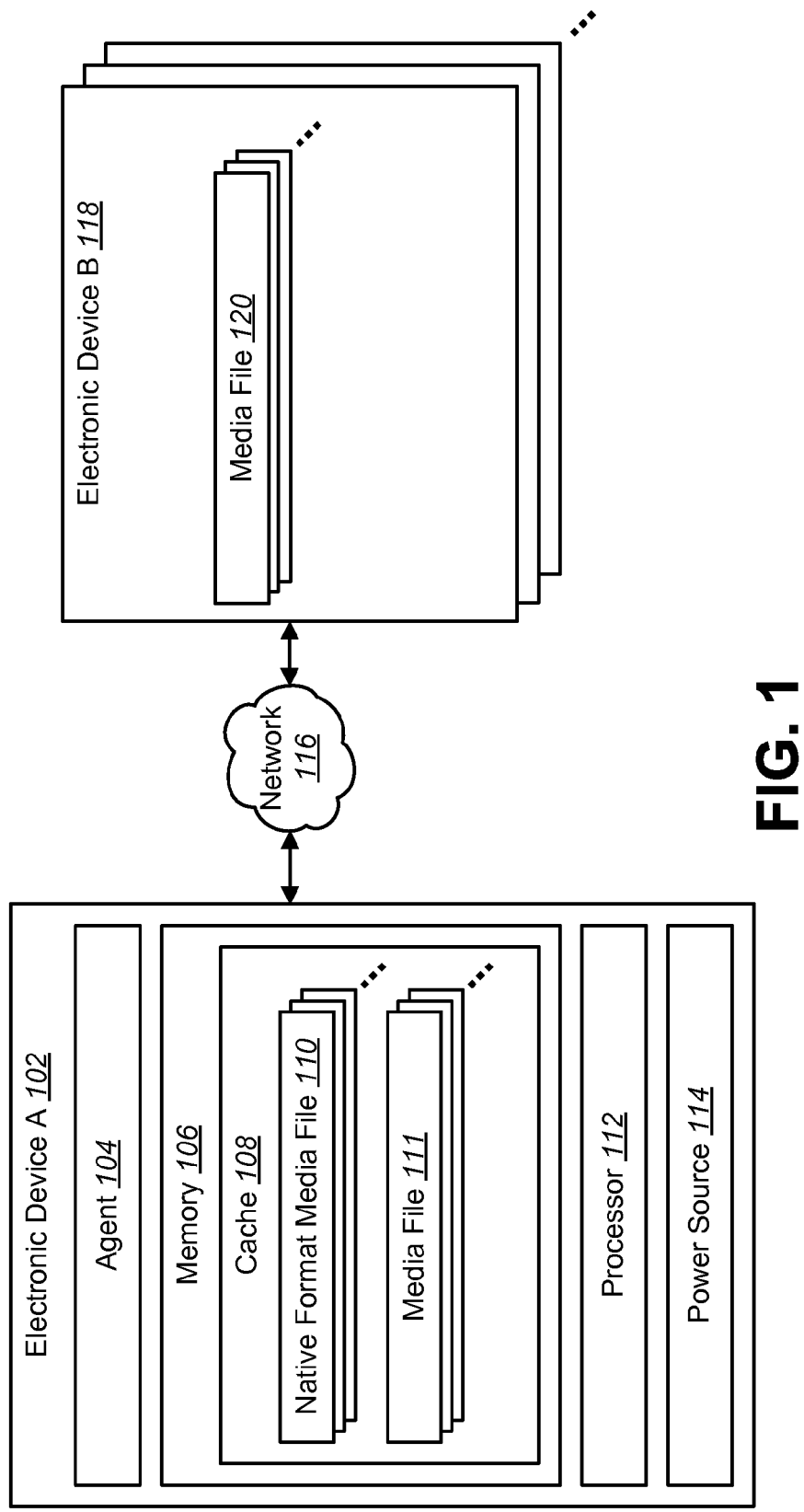
FIG. 1 is a block diagram illustrating one configuration of electronic devices in which systems and methods for media file caching for conserving resources may be implemented.

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as the Institute of Electrical and Electronics Engineers (IEEE) 802.11a, 802.11b, 802.11g, 802.11n, 802.11ac (e.g., Wireless Fidelity or "Wi-Fi") standards. Other examples of standards that a base station may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

As used herein, the term "wireless communication device" generally denotes a kind of electronic device (e.g., access terminal, client device, client station, etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

When an electronic device (e.g., wireless communication device) decodes media files or content (e.g., audio files, video files, Mobile Broadcast Services Enabler Suite (BCAST) television (TV), webcast TV, etc.), the electronic device or platform may be trained to anticipate future use. When the overhead for archiving the files or content is determined to be acceptable, the files or content may be stored in local storage devices such as flash memory, a Secure Digital (SD) card or in locally networked devices over Bluetooth, Wi-Fi (e.g., in accordance with IEEE 802.11 standards), etc. For example, consider a user that searches for a favorite song title or singer on a video website (e.g., YouTube). The video playlists are initially stored on the remote website server. Once the electronic device accesses the playlist, the compressed video content or files may be stored in local storage devices or in locally networked devices. With the playlist archived locally (e.g., on the electronic device or on a locally networked device), the content or file access overhead may be substantially reduced. Furthermore, one or more native formats may be used to store the content locally, which may also reduce the required processing for future use. The use of such caching technology for archiving frequently used files or content may lead to power efficient decoding of media files (e.g., files or streams) for the electronic device (e.g., wireless communication device). Of course, different types of media files may require different amounts of processing bandwidth. Accordingly, differing benefits may be obtained when archiving songs and music versus video and movies. Thus, the systems and methods disclosed herein may allow increased power efficient media (e.g., audio/video) decoding while enabling better Quality of Service (QoS) independent of the electronic device (e.g., wireless communication device) mobility.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of electronic devices 102, 118 in which systems and methods for media file caching for conserving resources may be implemented. Electronic device A 102 is capable of obtaining one or more media files or streams 120 using a network 116. For example, electronic device A 102 communicates with one or more electronic devices B 118 using a network 116. Examples of the network 116 include a Local Area Network (LAN), Wide Area Network (WAN), Public Switched Telephone Network (PSTN), the Internet, etc. Examples of electronic device A 102 include wireless communication devices (e.g., cellular phones, smart phones, music players, netbooks, laptop computers, e-readers, tablet devices, Personal Digital Assistants (PDAs), mobile gaming systems, etc.), desktop computers, televisions, "landline" phones, servers, gaming systems, etc. As used herein, the term "media file" refers to media (e.g., audio, video, one or more sounds, one or more images, etc.) data or content (e.g., a file, stream, packets, etc.) that may be delivered using the network 116 with any delivery procedure (e.g., stream, download, etc.) known in the art. For example, a media file 120 may be a music file or content, a video file or content and/or an image file or content that may be downloaded or streamed, etc. More specific examples of a media file 120 include BCAST TV, webcast TV, a song, a movie or show, etc.

One or more electronic devices B 118 communicate with electronic device A 102 using the network 116. Examples of electronic device B 118 include desktop computers, web servers, wireless communication devices and other electronic devices, etc. The one or more electronic devices B 118 include one or more media files 120.

Electronic device A 102 includes one or more processors 112, memory 106 and a power source 114. Memory 106 includes one or more devices that is/are capable of storing electronic information. Memory 106 may be built into electronic device A 102 and/or may be removable. For example, memory 106 may be a hard disk drive, flash memory, optical drive (e.g., Compact Disc (CD) drive, Digital Video Disc (DVD) drive, Blu-ray® disc drive, etc.), Secure Digital (SD) card, Universal Serial Bus (USB) drive, etc. In accordance with the systems and methods herein, the term "local memory" generally refers to memory that may be built into an electronic device, coupled to an electronic device or accessed by an electronic device in a local network. The memory 106 includes a cache 108. The cache 108 is a portion of memory 106 used to store data (e.g., files) for possible future data requests. According to the systems and methods disclosed herein, the cache 108 may be used to reduce resource (e.g., power) consumption.

The power source 114 may be a battery and/or an interface used to obtain electrical power, such as a Universal Serial Bus (USB) port or a plug or adapter used to receive power from a power outlet, for example. Electronic device A 102 may request access to and/or access the media file 120 using the network 116. For example, electronic device A 102 downloads or streams media files 120 such as music, movies or images. These media files 120 may be presented to a user by electronic device A 102. For example, electronic device A 102 may display or output images, videos and/or audio that have been retrieved from electronic device B 118 as one or more media files 120.

Electronic device A 102 may repeatedly request or access a media file 120. For example, a user of electronic device A 102 may repeatedly access the same media file 120 (e.g., image, video or audio). For instance, a user of electronic device A 102 may desire to repeatedly listen to the same song or view the same video provided by electronic device B 118. Repeatedly accessing the same media file 120 may be inefficient or unnecessarily consume network 116, processing 112, memory 106 and/or power source 114 resources. For example, each time electronic device A 102 downloads or streams a media file 120, the processor 112 may need to decode the media file 120, thereby consuming processor 112 resources and power from the power source 114. That is, the media file 120 may not be in a presentable format or may be in a format that is not presented as efficiently as in a native format. Thus, the media file 120 may be decoded for presentation on the wireless communication device 102. It should also be noted that network 116 bandwidth is consumed in the transfer of the media file 120.

Electronic device A 102 may include an agent 104. The agent 104 may be a software and/or hardware module that attempts to conserve electronic device A 102 resources, such as power source 114, processor 112 and/or memory 106 resources. Furthermore, the agent 104 may attempt to conserve network 116 resources. In a general sense, the agent 104 may determine when resources are likely to be conserved by storing or caching the media file 120. The media file 120 may be stored as an original format media file 111 and/or as a native format media file 110. For example, presenting an audio, video or image file locally in an original format 111 and/or in a native format 110 may consume less power source 114, processor 112, network 116 and/or memory 106 resources than transferring (e.g., downloading, streaming, etc.) the media file 120 through the network 116 and using the processor 112, memory 106 and/or power source 114 resources to decode the media file 120 for presentation. More specifically, in order to present the media file 120, electronic device A 102 may need to receive the media file 120, combine media file 120 packets, channel decode the media file 120, detect/correct errors in the media file 120, request retransmission of erroneously received media file 120, decode (e.g., decompress) the media file 120 for presentation, etc. This may require more resources than decoding (e.g., decompressing) the native format media file 110 or original format media file 111 from the cache 108 in local memory 106 for presentation. For instance, decoding (e.g., decompressing) a downloaded or streamed Moving Picture Experts Group-1 (MPEG-1) Audio Layer 3 (MP3) file (e.g., media file 120) may consume 30-40 milliamps (mA) from the power source 114, while decoding the file in native format 110 from memory 106 may consume 5 mA from the power source 114.

In one configuration, data (e.g., media data 110, 111) that is transferred between electronic device A 102 and electronic device B 118 is encapsulated in containers to specify its content, content format and/or potential security provisions (to verify its authenticity, to verify its integrity using a signature, etc., for example). This may be done according to a file protocol. One or more procedures used to process the file protocol in order to (strip the other information and) gain access to the intended content may be referred to as "decoding" or "file decoding."

As used herein, the term "native format" refers to a file format that may be efficiently decoded and/or presented. For example, electronic device A 102 may include certain software and/or hardware that decode and/or present native format media files 110 more efficiently than media files (e.g., media files 120) in other (e.g., "non-native") formats. In one configuration, "native format" refers to a protocol that requires a platform (e.g., electronic device A 102) to perform the least amount of processing or processing steps. Accordingly, "native format" may refer to a protocol that is most efficiently processed. In one configuration, electronic device A 102 includes multimedia player software that is designed to (efficiently) decode and present native format media files 110. Additionally or alternatively, electronic device A 102 may include other particular hardware and/or software modules that assist in the efficient decoding of native format media files 110. In one configuration, electronic device A 102 includes a hardware acceleration module for native format media files 110. The hardware acceleration module enables electronic device A 102 to decode and/or present native format media files 110 using less power and/or processing resources than decoding and/or presenting the media files 120 in a different format. Additionally, native format media files 110 may have less decoding complexity for electronic device A 102 than other file formats.

In one configuration, the agent 104 monitors and controls electronic device A's 102 access to the media file 120. For example, the agent 104 may determine whether the media file 120 should be stored (e.g., cached) as an original format media file 111 or as a native format media file 110 in the local memory 106 cache 108. For instance, the agent 104 may monitor how many times electronic device A 102 has accessed a particular media file 120. The agent 104 counts the number of times electronic device A 102 has requested or accessed the media file 120 using the network 116. If the number of media file 120 requests reaches a count threshold, the agent 104 saves (e.g., stores or caches) the media file 120 in an original format (e.g., as an original format media file 111) or in a native format (e.g., as a native format media file 110). If electronic device A 102 requests or accesses the media file 120 again, electronic device A 102 presents the original format media file 111 or native format media file 120 from the local memory 106 cache 108. That is, the agent 104 may detect the subsequent access requests and direct electronic device A 102 to present the original format media file 111 or native format media file 110 instead of the media file 120 from electronic device B 118. This may conserve processor 112, power source 114, network 116 and/or memory 106 resources. Furthermore, presenting the media file 110, 111 from local memory 106 may offer a more reliable presentation independent of how mobile electronic device A 102 is. For example, assuming that electronic device A 102 is a wireless communication device, presenting the media file 110, 111 from local memory may be independent of the wireless signal typically used to download or stream media files 120. This may enable better QoS.

In a more general sense, the agent 104 may attempt to conserve resources by storing the media file 120 in an original or native format when it 104 determines that resources are likely to be conserved by doing so. This may be implemented in many ways. As discussed above, one configuration may use a counter and a threshold such that the agent 104 determines that the resources used to store and/or present the original or native format media file 110 will likely be less than the resources used to obtain, decode and/or present the media file 120 for subsequent requests. For example, the agent 104 may set a count threshold of ten accesses or requests. If electronic device A 102 requests or accesses the same media file 120 ten times, the agent 104 determines that electronic device A 102 is likely to subsequently request or access the same media file 120 such that saving the media file 120 and presenting the original format media file 111 or native format media file 110 for subsequent requests will conserve resources. More sophisticated approaches may also be used involving additional or alternative information. Examples of additional or alternative information include request/access rates, media file 120 size, media file 120 type, usage history, genre, preferences, signal strength, Signal to Noise Ratio (SNR), error rates, etc.

Figure 2:
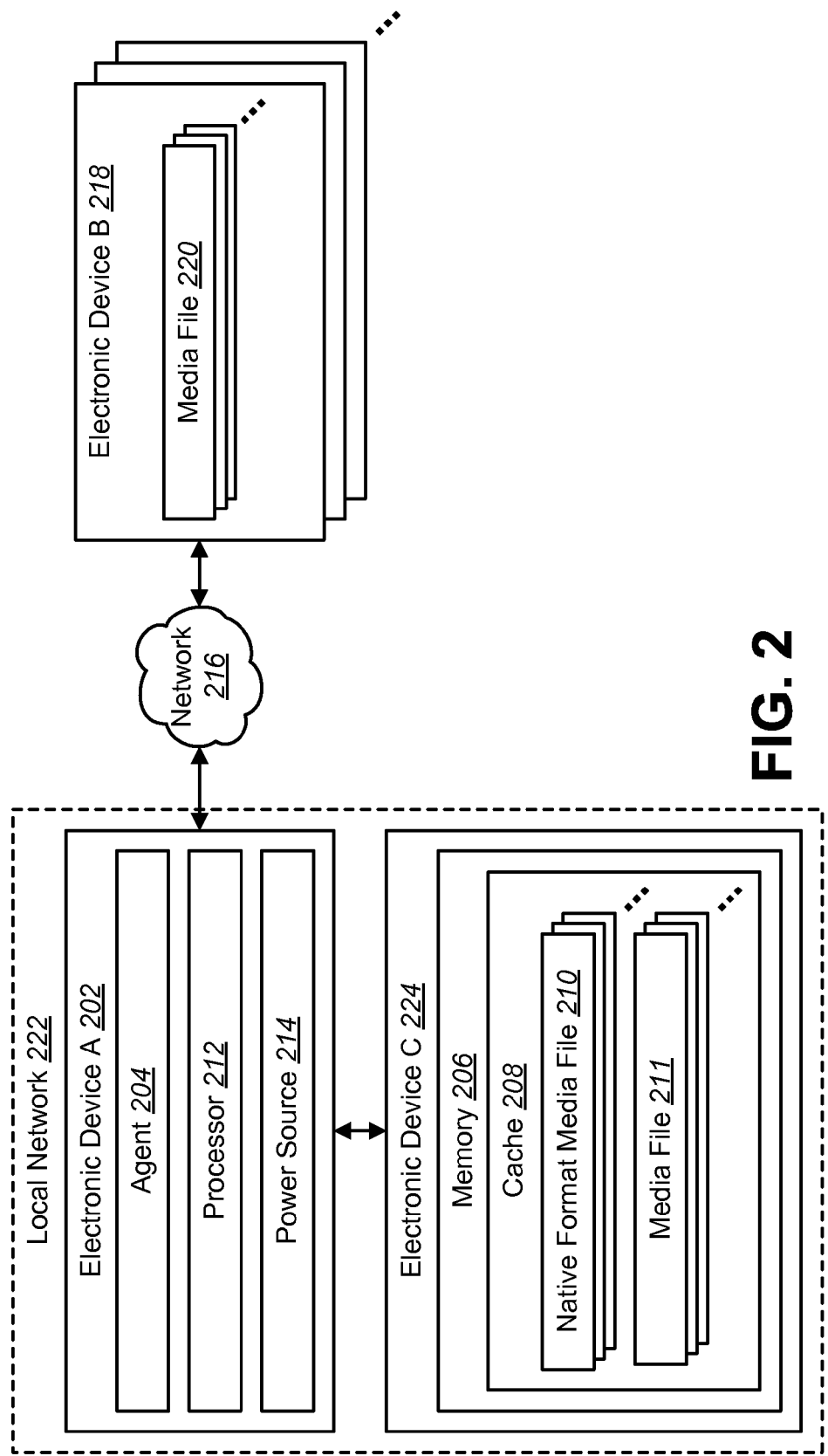
FIG. 2 is a block diagram illustrating another configuration of electronic devices in which systems and methods for media file caching for conserving resources may be implemented.

FIG. 2 is a block diagram illustrating another configuration of electronic devices 202, 218, 224 in which systems and methods for media file caching for conserving resources may be implemented. In this configuration, electronic device A 202 communicates with one or more electronic devices B 218 using a network 216. Electronic device A 202 includes an agent 204, a processor 212 and a power source 214. One or more electronic devices B 218 include one or more media files 220. For example, electronic device A 202 may be a smart phone or computer that communicates with a web server (electronic device B 218) over the Internet (network 216). Another electronic device C 224 includes a cache 208 in memory 206 and may communicate with electronic device A 202 in a local network 222. For example, electronic device A 202 may communicate with electronic device C 224 using a wireless and/or wired link (e.g., Bluetooth, Wi-Fi, USB, Ethernet, etc.). Examples of electronic device C 224 include desktop computers, laptop computers, servers, external storage devices, wireless headsets, etc.

In the configuration illustrated in FIG. 2, electronic device A 202 may repeatedly request or access the media file 220. As similarly discussed in relation to FIG. 1, the agent 204 determines whether the media file 220 should be stored locally in order to conserve resources. In this configuration, electronic device A 202 stores an original format media file 211 or native format media file 210 in the cache 208 in local memory 206 on electronic device C 224 when the agent 204 determines that doing so would likely conserve resources. That is, in addition to or alternatively to the configurations illustrated in FIG. 1, local memory 206 may be included in a separate electronic device (electronic device C 224) in a local network 222. For instance, the agent 204 may determine that storing and accessing the native format media file 210 from the cache 208 in local memory 206 on electronic device C 224 in a local network 222 will likely conserve resources (e.g., processor 212, power source 214, network 216 resources, etc.) when compared to (possibly repeatedly) downloading and decoding the media file 220 from electronic device B 218 using the network 216.

Figure 3:
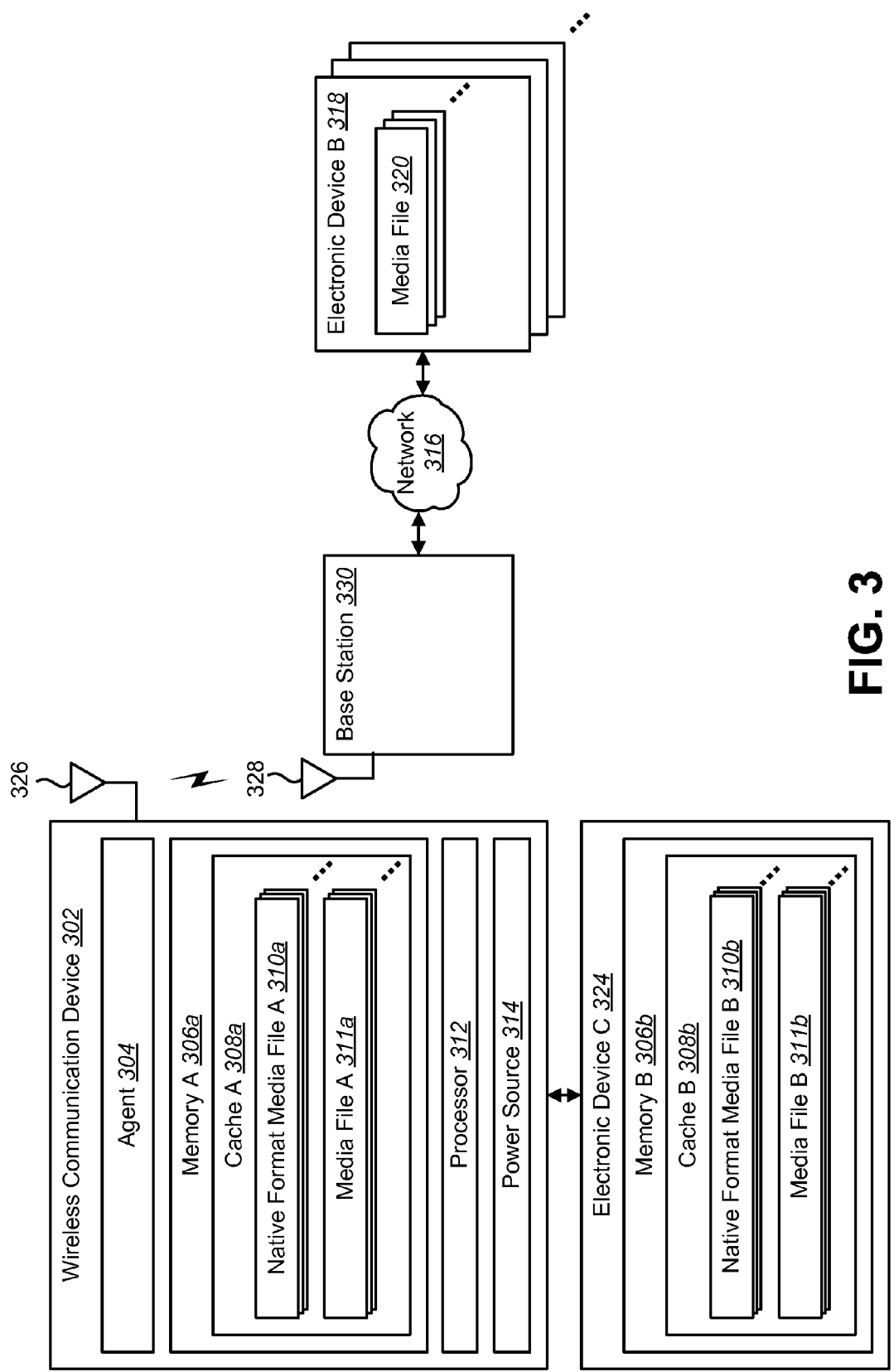
FIG. 3 is a block diagram illustrating configurations of a wireless communication device, a base station and other electronic devices in which systems and methods for media file caching for conserving resources may be implemented.

FIG. 3 is a block diagram illustrating configurations of a wireless communication device 302, a base station 330 and other electronic devices 318, 324 in which systems and methods for media file caching for conserving resources may be implemented. The wireless communication device 302 includes an agent 304, cache A 308a in memory A 306a, a processor 312 and a power source 314. The wireless communication device 302 may communicate with electronic device C 324, which includes cache B 308b in memory B 306b. The wireless communication device 302 includes one or more antennas 326 for wirelessly communicating with the base station 330. The base station 330 also includes one or more antennas 328 used for wireless communication. The base station 330 communicates with one or more electronic devices B 318 using a network 316. The one or more electronic devices B 318 include one or more media files 320. The wireless communication device 302 may request or access the one or more media files 320 on the one or more electronic devices B 318 using the base station 330 and the network 316.

The agent 304 on the wireless communication device 302 determines when resources (e.g., processor 312, power source 314, etc.) may likely be conserved by storing original format media file A 311a or native format media file A 310a in cache A 308a in local memory A 306a and/or by storing original format media file B 311b or native format media file B 310b in cache B 308b in local memory B 306b. When the agent 304 determines that resources will likely be conserved by storing an original format media file 311a-b or native format media file 310a-b in local memory 306a-b, the wireless communication device 302 stores the media file 320 as original format media file A 311a or native format media file A 310a in cache A 308a in memory A 306a on the wireless communication device 302 and/or as original format media file B 311b or native format media file B 310b in cache B 308b in memory B 306b on electronic device C 324. If the wireless communication device 302 subsequently requests or attempts to access the same media file 320, the agent 304 may instead direct the wireless communication device 302 to present the original format media file 311a-b or native format media file 310a-b from local memory A 306a or local memory B 306b.

Figure 4:
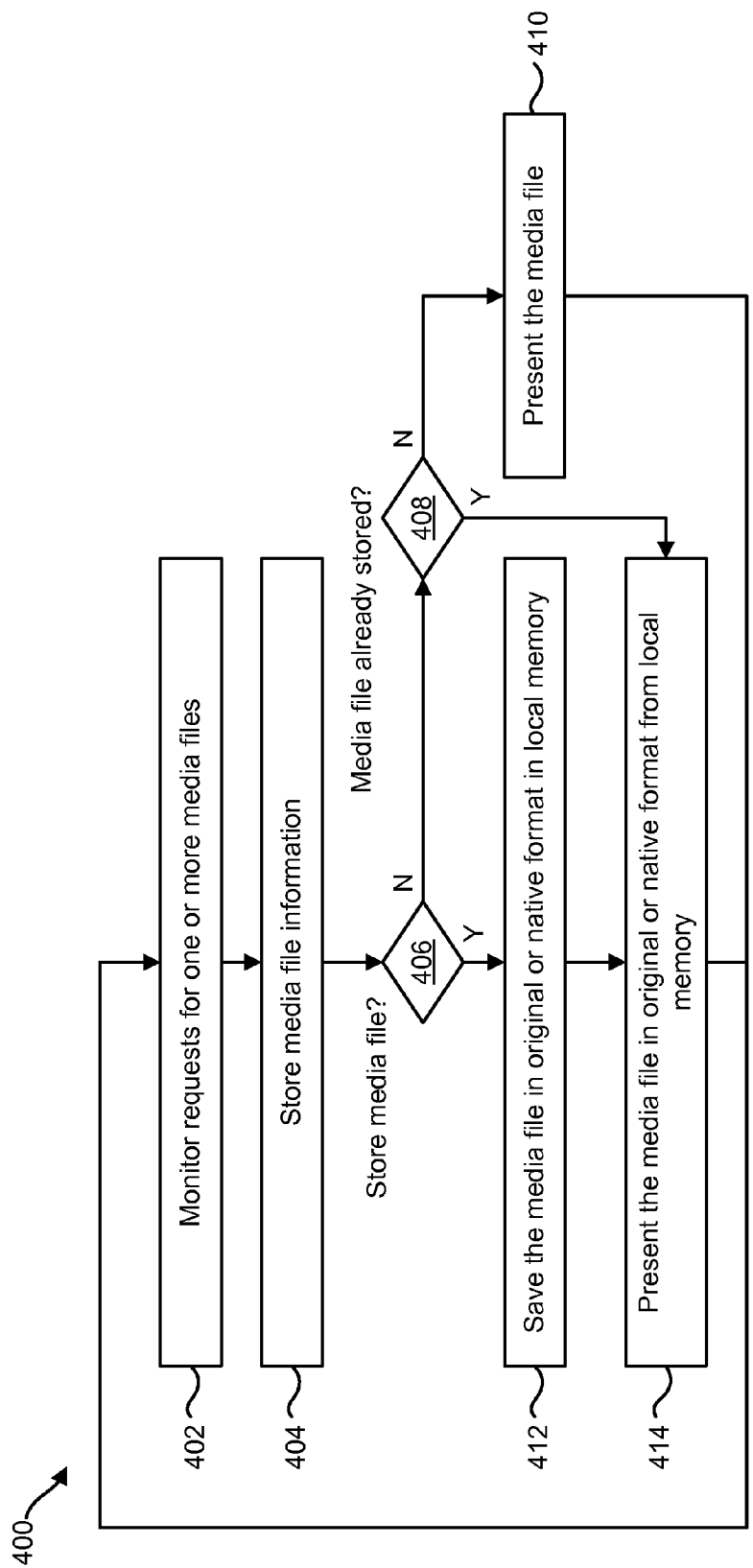
FIG. 4 is a flow diagram illustrating one configuration of a method for media file caching for conserving resources.

FIG. 4 is a flow diagram illustrating one configuration of a method 400 for media file caching for conserving resources. Electronic device A 102 monitors 402 requests for one or more media files. In general, electronic device A 102 monitors software and/or hardware components for media file 120 access requests. For example, an agent 104 may monitor one or more software applications or one or more hardware devices on electronic device A 102 for requests to access a media file 120 using the network 116. For example, the agent 104 may monitor 402 a browser application or multimedia player application for media file 120 requests. Additionally or alternatively, the agent 104 may monitor 402 an Operating System (OS) and/or Application Programming Interface (API) for media file 120 requests. Furthermore, the agent 104 may monitor 402 networking hardware included on electronic device A 102 for media file 120 requests.

Electronic device A 102 stores 404 media file information. For example, when the agent 104 detects media file 120 requests (while monitoring 402), the agent 104 may obtain and/or store 404 information associated with the media file request. More specifically, the agent 104 may store 404 media file information such as: the media file 120 name, the media file 120 location or address (e.g., Internet Protocol (IP) address), the media file 120 size (e.g., in Bytes), the media file 120 type (e.g., video, audio, image, etc.), the media file 120 format, the request time, and/or the number of requests made, etc. In some configurations, this information may also include information or metadata such as a genre, artist, publisher, etc. Examples of media file 120 formats include Windows Media Video (WMV), QuickTime file format (MOV), Advanced Audio Coding (AAC), MP3, Waveform Audio File Format (WAV), etc.

Electronic device A 102 determines 406 whether the media file 120 should be stored in the local memory 106 cache 108. This determination 406 may be based on the media file information and whether the media file 120 is already stored in the local memory 106 cache 108. In general, the determination 406 of whether the media file 120 should be stored may be based on whether locally storing or caching the media file 120 will likely conserve resources. This determination 406 may use one or more pieces of media file information.

In one configuration, the agent 104 counts a number of media file 120 accesses or requests to determine 406 whether the media file 120 should be stored. This media file request count is compared to a count threshold. The count threshold may represent a number of requests where subsequent accesses or requests are considered likely to occur. For instance, it may be considered that subsequent requests are likely for a particular video file that electronic device A 102 has previously requested ten times. Each time the wireless communication device 102 requests the video file on the network, the agent 104 increments a counter for that video file and compares it to the count threshold to determine 406 whether the video file should be stored. More generally, the agent 104 determines 406 whether locally storing the media file 120 in an original and/or native format is likely to conserve resources. If the video file has been requested ten times, the counter value is greater than or equal to the count threshold. In this case, electronic device A 102 or the agent 104 determines 406 that the video file should be saved as an original format media file 111 or native format media file 110 in the local memory 106 cache 108.

In another configuration, electronic device A 102 determines 406 whether to store the media file 120 based on a request rate and a rate threshold. For example, the agent 104 stores 404 the number of media file 120 requests and times when the requests occurred. Using the number of requests and the times, the agent 104 may determine the request rate. If electronic device A's 102 request rate is greater than or equal to the rate threshold, electronic device A 102 determines 406 that the media file 120 should be stored in a native format in the local memory 106 cache 108. In other configurations, many other factors may additionally or alternatively be taken into consideration to determine 406 whether the media file 120 should be stored. More detail on these other factors and how they may be used is given below.

If electronic device A 102 determines 406 that the media file 120 should not be stored, it 102 may determine 408 whether the media file 120 is already stored in the local memory 106 cache 108. For example, if the agent 104 has already stored an original format media file 111 or native format media file 110 corresponding to the media file 120 that is being requested, the agent 104 directs electronic device A 102 to present 414 the original format media file 111 or native format media file 110 from local memory 106 (e.g., instead of accessing the media file 120 over the network 116). Electronic device A 102 may continue monitoring 402 requests for one or more media files 120.

If electronic device A 102 determines 406 not to store the media file 120 and that the media file 120 is not already stored, it 102 presents 410 the media file 120. For example, electronic device A 102 may download or stream, decode and present 410 the media file 120. For instance, electronic device A 102 downloads a music file, decodes the music file, and outputs the music file using a multi-media player and one or more speakers. Electronic device A 102 may then continue monitoring 402 requests for one or more media files 120.

If electronic device A 102 determines 406 that the media file 120 should be stored, it 102 may obtain (e.g., download, stream, etc.) the media file 120 and save 412 the media file 120 in an original or native format. For example, assume that the media file 120 is a video file. The agent 104 saves the video file in its original format or transcodes the video file into a native format. For instance, if the video file is a Windows Media Video (WMV) file and electronic device A's 102 native format is H.264, the agent 104 may transcode the WMV file into H.264 format. The transcoding may be done while the media file 120 is being decoded. That is, electronic device A 102 may decode and transcode the media file 120. However, if the media file 120 is already in a native format, then electronic device A 102 may not transcode the media file 120. Rather, electronic device A 102 may store the media file 120 as a native format media file 110 in the local memory 106 cache 108. Alternatively, if the agent 104 determines that the media file 120 should be saved in its original format (that is not a native format), the electronic device 102 saves the media file 120 as an original format media file 111. As mentioned above, the local memory 106 may be built into electronic device A 102, removable from electronic device A 102 and/or accessible by electronic device A 102 on a local network 222.

Electronic device A 102 may present 414 the media file 110, 111. In one configuration, the media file 120 may be presented 414 in a native format (e.g., as a native format media file 110) from the local memory 106 cache 108. In this configuration, the native format media file 110 may be decoded and presented 414 from local memory 106. For example, electronic device A 102 plays video or audio using a multimedia player, one or more displays and/or one or more speakers. In another configuration, electronic device A 102 may present 414 the media file 120 in its original format. For example, the media file 120 may be decoded in its original format while being transcoded and saved 412 as a native format media file 110. In this case, electronic device A 102 may present 414 the decoded media file 120 in its original format while the media file 120 is being transcoded and saved 412 to local memory 106. Then, for subsequent media file 120 requests, the native format media file 110 may be presented. In another configuration, electronic device A 102 presents the original format media file 111 that has been saved in local memory 106. Electronic device A 102 may continue monitoring 402 requests for one or more media files 120.

Figure 5:
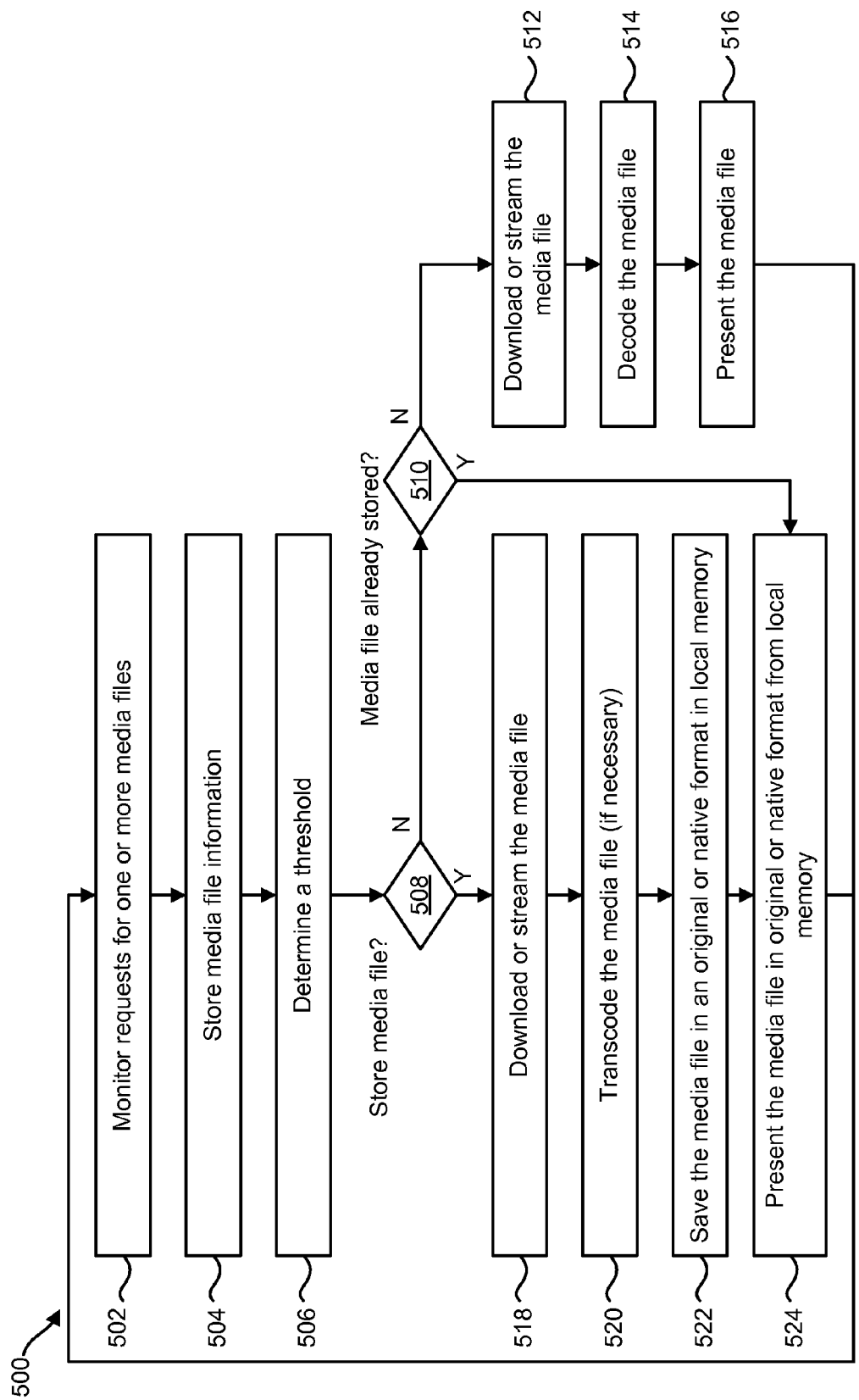
FIG. 5 is a flow diagram illustrating a more detailed configuration of a method for media file caching for conserving resources.

FIG. 5 is a flow diagram illustrating a more detailed configuration of a method 500 for media file caching for conserving resources. Electronic device A 102 monitors 502 requests for one or more media files 120. Generally, electronic device A 102 monitors 502 software and/or hardware components for requests for one or more media files 120. For example, an agent 104 may monitor 502 one or more software applications or one or more hardware devices on electronic device A 102 for requests to access a media file 120. For example, the agent 104 monitors 502 a browser application or multimedia player application for media file 120 requests. Additionally or alternatively, the agent 104 may monitor 502 an Operating System (OS) and/or Application Programming Interface (API) for media file 120 requests. Furthermore, the agent 104 may monitor 502 networking hardware included on electronic device A 102 for media file 120 requests.

Electronic device A 102 stores 504 media file information. For example, when the agent 104 detects a media file 120 request (while monitoring 502), the agent 104 may store 504 information associated with the media file 120 request. More specifically, the agent 104 may store 504, for example: the media file 120 name, the media file 120 location or address (e.g., Internet Protocol (IP) address), the media file 120 size (e.g., in Bytes), the media file 120 type (e.g., video, audio, image, etc.), the media file 120 format (e.g., WMV, MOV, AAC, MP3, etc.), the request time, and/or the number of requests made, etc. In some configurations, this information may also include information or metadata such as a genre, artist, publisher, etc. The media file information may be stored 504, for example, in a file and/or database in local memory 106.

When storing 504 the media file information, electronic device A 102 may increment a media file 120 request count. For example, electronic device A 102 compares media file information (e.g., file name, address, etc.) corresponding to the recently detected media file 120 request with previously stored 504 media file information. If electronic device A 102 determines that that the recent media file information matches previously stored 504 media file information (indicating that a previously requested media file 120 is being requested again), it 102 may increment a count corresponding to that media file 120. For instance, assume that the media file 120 is a music file. Electronic device A 102 detects a media file 120 request (while monitoring 502) and stores 504 information corresponding to the music file request, such as the file name and IP address. Other information stored 504 might include information such as file size, artist name, genre, etc. Electronic device A 102 compares, for example, the file name and IP address to previously recorded 504 media file information and determines that the music file has been requested twice previously (with a request count of two). This means that the music file has already been requested by electronic device A 102 twice. The count is incremented to three and operation proceeds. However, in the case that electronic device A 102 does not find a match for the media file 120 requested, it 102 may create a new record including the media file information 504 and increment the count for that media file 120 to one.

Electronic device A 102 may optionally determine 506 a count and/or rate threshold. As described above, a count or rate threshold may be based on the likelihood or probability that additional media file 120 requests will occur beyond the threshold number of media file 120 requests. The count or rate threshold may be selected such that repeated accesses of the media file 120 are likely to occur beyond the threshold such that resources may be conserved by storing the media file 120. In one configuration, a count or rate threshold may be set, for example, by a user or manufacturer of electronic device A 102.

Alternatively or in addition, the count or rate threshold may be determined 506 by electronic device A 102. Different configurations of electronic device A 102 may make this determination 506 based on a variety of different factors, either individually or in combination. For example, the count or rate threshold may be determined 506 based on factors such as user behaviors. To illustrate this point, assume that a first user and a second user have different usage patterns. For example, if the first user listens to a (downloaded or streamed) song twice, he tends to consistently listen to the same song about 200 times. On the other hand, the second user tends to listen to a (downloaded or streamed) song only once or perhaps twice before listening to something else. Electronic device A 102 may store 504 these usage patterns to set the count threshold. In the example discussed, electronic device A 102 may set the count threshold low (e.g., three) for the first user and high for the second user (e.g., 15). This is because the amount of resources likely to be conserved by storing the song in a native format are much greater for the first user after only listening to the song a few times compared to the second user, who may not even listen to the same song twice.

Other user usage patterns may also be used to determine 506 the count or rate threshold. For example, a user may tend to listen to songs in the jazz genre many times while rarely watching a wrestling match more than once. This example illustrates that different thresholds may be desirable for different media file 120 types and/or genres. According to the example, electronic device A 102 may store 504 the user's usage patterns and set a low threshold for jazz music files and a higher threshold for wrestling video files.

Other factors that may be used to determine 506 the count or rate threshold include media file 120 formats and sizes. For example, different file formats may require more processing to decode and/or transcode than others. For the sake of illustration, assume that a MOV (Apple movie) file requires much more processing to transcode into H.264 than a WMV file. Thus, the count or rate threshold may be set lower for WMV files than for MOV files. File sizes, for example, may additionally or alternatively be used to determine 506 the count or rate threshold. For instance, transcoding a large file may require a relatively large amount of processing and power resources (e.g., overhead). However, resource savings may also be potentially very large if a user tends to consistently watch high resolution movies many times. Thus, the count or rate threshold may be set lower for a large file size in that case. However, if another user watches each high resolution movie only once, it would waste resources to transcode and store each movie file. Thus, the threshold may be set high in that case.

Yet other factors could be used to determine 506 the count or rate threshold. For example, signal quality, SNR or bit error rate may be used to determine 506 the count or rate threshold. For example, wireless communication devices 302 may boost gain, use a lower data rate and/or use more redundancy or longer coding schemes when they have a weak communication signal with a base station 330. If the signal is such that it requires more battery (e.g., power source 314) to repeatedly receive and/or decode the media file 120 in its original format than to transcode the media file 120 and decode it in a native format, the threshold may be lowered.

Electronic device A 102 determines 508 whether the media file 120 should be stored in local memory 106. This determination 508 may be based on the media file information and whether the media file 120 is already stored in local memory 106. In general, the determination 508 of whether media file 120 should be stored may be based on whether locally storing or caching the media file 120 will likely conserve resources. This determination 508 may use one or more pieces of media file information.

In one configuration, if the media file 120 request count is greater than or equal to the count threshold and the media file 120 is not already stored in a native format, electronic device A 102 determines 508 that the media file 120 should be stored in local memory 106. This is illustrated in Equation (1).

$$\text{Request Count} \geq \text{Threshold} \qquad (1)$$

In Equation (1), Request Count is the request count and Count Threshold is the count threshold. More specifically, the agent 104 counts a number of media file 120 requests to determine 508 whether the media file 120 should be stored. This media file request count is compared to a count threshold. As discussed above, the count threshold may represent a number of requests where subsequent requests are considered likely to occur. For instance, it may be considered that subsequent accesses are likely for a particular video file that electronic device A 102 has previously requested ten times. Each time the wireless communication device 102 requests the video file on the network 116, the agent 104 increments a counter for that video file and compares it to the count threshold to determine whether the video file should be stored (e.g., whether storing the media file 120 is likely to conserve resources). If the video file has been requested ten times, the counter value is greater than or equal to the count threshold and electronic device A 102 or agent 104 determines 508 that the video file should be stored.

In another configuration, if the media file 120 request rate is greater than or equal to the rate threshold and the media file 120 is not already stored, electronic device A 102 determines 508 that the media file 120 should be stored as an original format media file 111 or native format media file 110 in the local memory 106 cache 108. This approach is illustrated in Equation (2).

$$\text{Request Rate} \geq \text{Rate Threshold} \qquad (2)$$

In Equation (2), Request Rate is the request rate and Rate Threshold is the rate threshold. More specifically, electronic device A 102 determines 508 whether to store the media file 120 based on a request rate and a rate threshold. For example, the agent 104 stores 504 the number of media file 120 requests and times corresponding to the requests. The agent 104 may then use the number of accesses and corresponding times to compute a request rate or average request rate. If electronic device A's 102 request rate is greater than or equal to the rate threshold, electronic device A 102 determines 508 that the media file 120 should be stored.

In another configuration, the determination 508 may be based directly on whether storing the media file 120 as an original format media file 111 or native format media file 110 in the local memory 106 cache 108 will conserve resources with some degree of probability. One or more of the same or similar factors mentioned above (to determine a count or rate threshold) may be directly used to determine 508 whether storing the media file 120 as a native format media file 110 in the local memory 106 cache 108 will likely conserve resources. For example, if the probability that storing the media file 120 as a native format media file 110 in local memory 106 will conserve resources is greater than or equal to the probability that it will not (and the media file 120 is not already stored as a native format media file 110), the electronic device 102 or agent 104 determines 508 that the media file 120 should be stored as a native format media file 120 in the local memory 106 cache 108. This approach is illustrated in Equation (3).

$$P(C) \geq P(C') \text{ or}$$

$$P(C) \leq 0.5 \qquad (3)$$

In Equation (1), P (C) represents the probability that storing the media file 120 will conserve resources and P (C') represents the probability that storing the media file 120 will not conserve resources. Many different approaches may be used to compute this probability based on various factors. One or more of the factors may include the number of times the media file 120 has been requested, when the media file 120 has been requested, the rate of media file 120 requests (e.g., how often the media file 120 has been requested within a given amount of time), the media file 120 size, the media file 120 format (e.g., file format such as WMV, MOV, MP3, etc.), the media file 120 type (e.g., video, audio, image), media file 120 metadata (e.g., artist, genre, producer, etc.), signal power, SNR, bit error rate, usage patterns, native format (e.g., H.264, etc.), the amount of power/processing needed to transcode the media file 120, the amount of power/processing needed to decode the media file 120, the amount of power/processing needed to decode the native format media file 110 or the original format media file 111, the network load caused by downloading or streaming the media file 120, etc. In other words, one or more of these or other factors may be used to compute the probability that storing the media file 120 as an original format media file 111 or a native format media file 110 will conserve one or more resources.

Electronic device A 102 may determine 508 that the media file 120 should not be stored. This may occur, for example: if the media file 120 request count is not greater than or equal to the count threshold or the media file 120 is already stored; if the media file 120 access rate is not greater than or equal to the rate threshold or the media file 120 is already stored; or, if the probability that storing the media file 120 will conserve resources does not meet some degree of probability or the media file 120 is already stored, etc. If electronic device A 102 determines 508 that the media file 120 should not be stored, it 102 may determine 510 whether the media file 120 is already stored in the local memory 106 cache 108. For example, if the agent 104 has already stored a media file 110, 111 corresponding to the media file 120 that is being requested, the agent 104 directs electronic device A 102 to present 524 the media file 110, 111 from local memory 106. Electronic device A 102 may continue monitoring 502 requests for one or more media files 120.

If electronic device A 102 determines 508 not to store the media file 120 and that the media file 120 is not already stored in a native format, it 102 may download or stream 512 the media file 120. For example, electronic device A 102 may use software and/or hardware to request and/or receive the media file 120 from electronic device B 118. The media file 120 may be downloaded 512 as a file or streamed 512 (e.g., received) as a data stream, for example. Electronic device A 102 may decode 514 the media file 120. For example, electronic device A 102 may use software, hardware and/or one or more codecs to decode the media file 120 into a presentable (e.g., playable) format. Electronic device A 102 may present 516 the media file 120. In summary, for instance, electronic device A 102 downloads 512 a music file, decodes 514 the music file, and outputs 516 the music file using a multi-media player and one or more speakers. Electronic device A 102 then continues monitoring 502 requests for one or more media files 120.

If electronic device A 102 determines 508 that the media file 120 should be stored, it 102 may download or stream 518 the media file 120 using hardware and/or software on electronic device A 102. Electronic device A 102 may transcode 520 the media file if necessary. For example, the agent 104 may use a transcoder module to transcode the media file 120 from one file format into a native file format, thereby producing a native format media file 110. For instance, if the video file is a Windows Media Video (WMV) file and electronic device A's 102 native format is H.264, the agent 104 transcodes the WMV file into H.264 format. However, if the media file 120 is already in the desired native format, the agent 104 may not transcode the media file 120. Transcoding may be done during, after, or independent of decoding.

Electronic device A 102 may then save 522 the media file 120 in an original or native format in the local memory 106 cache 108. For example, the agent 102 writes the original format media file 111 or the native format media file 110 to flash memory, a hard drive, an optical disc, an SD card, a USB drive, storage on a locally networked device, etc. Electronic device A 102 may then present 524 the media file 110, 111 from the local memory 106 cache 108. For example, electronic device A 102 may decode (e.g., decompress) the native format media file 110 and play or output the media file. More specifically, if the native format media file 110 is a video file, electronic device A 102 displays the video on a display and outputs the corresponding audio using one or more speakers. Electronic device A 102 may continue monitoring 502 requests for one or more media files.

Figure 6:
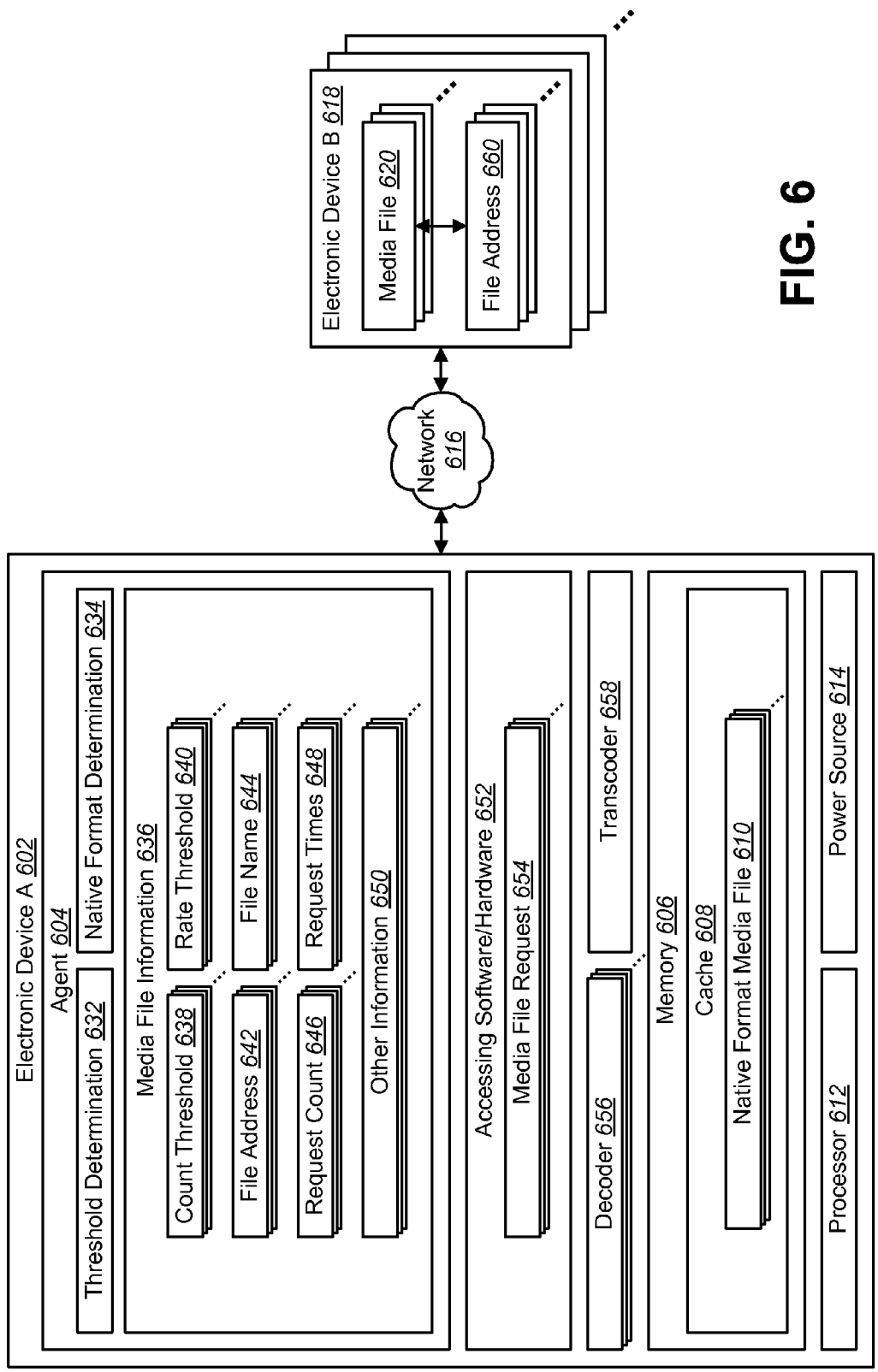
FIG. 6 is a block diagram illustrating a more detailed configuration of electronic devices in which systems and methods for media file caching for conserving resources may be implemented.

FIG. 6 is a block diagram illustrating a more detailed configuration of electronic devices 602, 618 in which systems and methods for media file caching for conserving resources may be implemented. Electronic device A 602 may include an agent 604, accessing software/hardware 652, memory 606, one or more decoders 656, a transcoder 658, a processor 612 and a power source 614. Electronic device A 602 may communicate with one or more electronic devices B 618 using the network 616. The one or more electronic devices B 618 may include one or more media files 620 that may be accessed at one or more file addresses 660. The power source 614 may be a battery or interface for receiving electrical power.

The agent 604 may be a software and/or hardware module used to cache media files 620 in an attempt to conserve resources, such as battery 614 power, processor 612 resources, etc. The agent 604 includes media file information 636. Media file information 636 may include various kinds of information that is pertinent to one or more media files 620. In the example illustrated in FIG. 6, media file information 636 includes one or more count thresholds 638, one or more rate thresholds 640, one or more file addresses 642, one or more file names 644, one or more request counts 646, one or more request times 648 and other information 650. When a media file 620 is requested by electronic device A 602, the agent 604 stores media file information 636 (and/or determines information for storage) relating to the media file 620 requested.

For example, the agent 604 monitors accessing software and/or hardware 652 for one or more media file requests 654. The accessing software and/or hardware 652 may include one or more modules that request media files 620 over the network 616. One example of accessing software/hardware 652 is a browser application or program on electronic device A 602 that requests media files 620. Multimedia player software and networking hardware are other examples of the accessing software/hardware 652 that the agent 604 may monitor to detect media file requests 654.

When a media file request 654 is detected, the agent 604 stores media file information 636. For example, the agent 604 may store the file name 644 of the media file 620 requested. The file address 642 used to request the media file 620 may also be stored. Examples of the file address 642 include Internet Protocol (IP) addresses, Uniform Resource Locators (URLs), network addresses, etc. The agent 604 may also store one or more request counts 646 and one or more request times 648. For example, each time a particular media file 620 is requested, the agent 604 may increment the request count 646 for that media file. The request count 646 thus indicates the number of times a particular media file 620 has been requested. The agent 604 may also store request times 648 that indicate the times at which one or more particular media files 620 were requested. The agent 604 may additionally or alternatively store other information 650 (e.g., metadata, file type, SNR, bit error rate, etc.), depending on the configuration implemented.

The media file information 636 may optionally include one or more count thresholds 638 and/or one or more rate thresholds 640. The count threshold(s) 638 and/or rate threshold(s) 640 may be set by a user of electronic device A 602. Alternatively, electronic device A 602 may determine (e.g., compute) the one or more count thresholds 638 and/or the one or more rate thresholds 640. As described above, the count threshold(s) 638 and/or rate threshold(s) 640 may be determined based on one or more factors, such as usage patterns, media file 620 size, media file 620 type, the amount of resources (e.g., power, processing, etc.) needed to transcode the media file 620, the amount of resources (e.g., power, processing, etc.) needed to decode the media file 620, etc. The agent 604 may use a threshold determination module 632 to determine the one or more count thresholds 638 and/or the one or more rate thresholds 640. In one configuration, a single count threshold 638 or rate threshold 640 may be used for all media files 620. In other configurations, a count threshold 638 or rate threshold 640 may be used for each media file 620 or for a group or category of media files 620.

The agent 604 may also include a native format determination module 634. The native format determination module 634 may determine a native format for a media file 620. For example, the native format determination module 634 determines the native format for a media file 620 that would likely conserve the most resources. The native format determination module 634 may use factors such as the amount of resources (e.g., power, processing, etc.) needed to transcode a media file 620 from one format into one or more native formats, the amount of resources needed to decode the media file 620 and the native format media file 610, etc.

Electronic device A 602 may use the one or more decoders 656 to decode media files 620 and/or native format media files 610. A decoder 656 may be implemented as software, hardware or a combination of both. Examples of decoders 656 include software and/or hardware codecs. For instance, a decoder 656 is used to decode (e.g., decompress) a media file 620 that is downloaded or streamed from electronic device B 618. The media file 620 is decoded in order to present the media file 620 on electronic device A 602. Additionally, a decoder 656 may decode a native format media file 610 (or a stored original format media file) in order to present it 610 on electronic device A 602. Decoding a native format media file 610 may use less resources than decoding a downloaded or streamed media file 620.

Electronic device A 602 may also include a transcoder 658. The transcoder 658 may be a hardware and/or software module that converts a media file 620 from one format (e.g., coding) into another format (e.g., coding). For example, if the media file's 620 format is WMV and the native format is H.264, electronic device A 602 converts the WMV file into an H.264 native format media file 610. Transcoding a media file 620 may be performed in conjunction with decoding the media file 620. For example, the media file 620 may be downloaded and decoded (e.g., using the decoder 656) into an intermediate format. The transcoder 658 then codes the intermediate format media file 620 into a native format media file 610. One or more native format media files 610 may be saved or stored in the cache 608 in local memory 606.

However, in some configurations, "transcoding" may be a procedure for converting encoded data into another coded format without decoding the data into an un-coded format. In those configurations, for instance, the transcoder 658 may convert data in one coded format into another without decoding the data into an un-coded format. For example, video data may not be viewable when transcoding MPEG-4 format to H.264. However, in other configurations, "transcoding" may allow the data to be decoded into an un-coded format when converting the data into another coded format, as described above.

FIG. 7 is a diagram illustrating an example of information 700 that may be used by an electronic device 102 to determine a native format. An agent 104 may maintain and update such information 700. The information illustrated may be used to determine a native format 764 for transcoding. For example, electronic device A 102 may use one or more native formats 764. In one configuration, electronic device A 102 includes different software applications that use different native formats for presenting media files. Furthermore, electronic device A 102 may operate different files types such as audio files, video files and image files. Each of these file types may use a different native format 764 on electronic device A 102. In another configuration, electronic device A 102 includes a multimedia player that may use several different native file formats 764. As described above, electronic device A 102 may include other software or hardware modules (e.g., a hardware accelerator) that make decoding more efficient for some (e.g., native) formats.

In FIG. 7, multiple media file formats 762a-n are illustrated along with several native formats 764a-n. Electronic device A 102 may use, for example, transcoding costs 766aa-nn and/or native decoding costs 768aa-nn to determine which native format 764 to use in transcoding. Each of the media file formats 762a-n represents a media file 120 format or coding. A media file format 762 typically adheres to a particular format or coding. For example, an MP3 audio file may have a specific frame structure including certain bits designated as header bits. These header bits indicate information such as frequency, bit rate, mode, copy information, etc. A certain amount of processing may be required to transcode a media file 120 from its format 762 into a native format 764. The processing required to transcode the media files 120 requires electrical power (e.g., from the power source 114). For example, a transcoding cost 766 may be expressed in milliamps (mA) per Byte (B) of media file 120 data. Furthermore, each native format 764 may have an associated native decoding cost 768. The native decoding cost 768 may indicate the amount of processing and/or power resources needed to decode a native format media file 110 for presentation on electronic device A 102, for example. In one configuration, the native decoding cost 768 may also be expressed in milliamps per Byte of native format media file 110 data.

In one configuration, electronic device A 102 determines which native format 764 to use (for transcoding) based on the transcoding cost 766 and/or native decoding cost 768. Assume, for example, that electronic device A 102 receives a media file 120 in format A 762a. Electronic device A 102 may compare the transcoding costs 766aa-an and/or native decoding costs 768aa-an of the native formats 764a-n to determine which native format 764a-n would likely conserve the most resources. In one configuration, electronic device A 102 compares only the native decoding costs 768aa-an and selects the native format 764a-n with the lowest decoding cost.

In another configuration, electronic device A 102 also compares transcoding costs 766aa-an. For example, assume that to transcode a media file 120 from format A to native format A 764a has transcoding cost AA 766aa of 200 mA and native decoding cost AA 768aa of 5 mA (for a given file size). Further assume that transcoding cost AB 766ab is 100 mA and that native decoding cost AB 768ab is 20 mA (for a given file size). The amount of power that may likely be conserved depends on the number of times electronic device A 102 will likely decode the native format media file 110 for presentation. For example, if electronic device A 102 decodes the native format media file 110 seven times or more, then native format A 764a would be less costly than native format B 764b, since (200 mA+7*5 mA)=235 mA is less than (100 mA+7*20 mA)=240 mA. However, if electronic device A 102 decodes the native format media file 110 six times or less, then native format B 764b would be less costly than native format A 764a, since (100 mA+6*20 mA)=220 mA is less than (200 mA+6*5 mA)=230 mA. Thus, electronic device A 102 may select native format A 764a for transcoding if a particular user is more likely to request the same media file 120 seven times or more than six times or less. Conversely, if another user is more likely to request the same media file 120 six times or less than seven times or more, electronic device A 102 may select native format B 764b for transcoding.

It should be noted that some media files 120 may already be in native format 764 in some cases. That is, media file formats 762 may also include one or more native formats 764. In such a case, electronic device A 102 may determine if more resources (e.g., processing, power) would be conserved by maintaining the media file 120 in a native format 764 or transcoding it 120 into another native format 764. This may be similarly done by comparing native decoding costs 768 and/or the transcoding cost 766 to transcode it into another native format 764 versus not transcoding it (e.g., with a transcoding cost of 0 mA).

FIG. 8 is a diagram illustrating one example of media file information 836 that may be used by an electronic device to determine whether to store a media file 120 as an original format media file 111 or a native format media file 110 in a local memory 106 cache 108. The media file information 836 illustrated in FIG. 8 may be maintained and updated by an agent 104. In this example, the media file information 836 includes a number of requests 846, request times 848, a file size 870, a file format 872, a decoding cost 874, a transcoding cost 866, a native decoding cost 868, a count threshold 838, a rate threshold 840, a file address 842, a file name 844, a file type 876, metadata 878 and other information 850 for several media files 820a-n.

The number of requests 846 for each media file 846a-n indicates the number of times the particular media file 120 has been requested by electronic device A 102. The request times 848 for each media file 848a-n indicate when each request has been made. The file size 870 for each media file 870a-n indicates the file size (e.g., in Bytes, etc.). The file format 872 for each media file 872a-n indicates the format (e.g., WMV, MOV, AAC, MP3, WAV, etc.) of each media file 820a-n. The decoding cost 874 for each media file 874a-n indicates the amount of resources needed to decode each media file 820a-n (and optionally download, channel decode, etc.) from electronic device B 118. The transcoding cost 866 for each media file 866a-n indicates the amount of resources needed to transcode each media file 820a-n into a native format media file 110. The native decoding cost 868 for each media file 868a-n indicates the amount of resources needed to decode the native format media file 110. It should be noted that resources may be in terms of amount of processing resources, memory resources, power resources, network resources, communication resources, etc. The count threshold 838 for each media file 838a-n indicates the count threshold for saving each media file 820a-n as a native format media file 110 (e.g., if the number of requests is greater than or equal to the count threshold 838). The rate threshold 840 for each media file 840a-n indicates the rate threshold for saving each media file 820a-n as a native format media file 110 if the rate of requests is greater than or equal to the rate threshold 840, for example. The file address 842 for each media file 842a-n indicates an address for each media file 820a-n. The file name 844 for each media file 844a-n indicates the file name for each media file 820a-n. The file type 876 for each media file 876a-n indicates the type of file (e.g., audio, video, image) for each media file 820*a-n*. The metadata 878 for each media file 878*a-n* may include metadata such as an artist name, producer, etc. Other information 850 for each media file 850*a-n* may also be used. For example, electronic device A 102 may use costs such as the amount of processing or power needed to access, decode and/or present an original format media file 111 from memory 106.

As described above, electronic device A 102 monitors requests for one or more media files 820. When a media file 820 request is detected, electronic device A 102 (e.g., the agent 104) stores media file information 836 corresponding to the request. For example, the first time a request is made for a particular media file 820, the agent 104 may determine that the media file 820 has not been requested previously, since its file name 844 and/or file address 842 are not included in the media file information 836. The agent 104 then stores the media file 120 name 844, address 842, size 870, format 872, type 876, any metadata 878 and any other relevant information 850. The agent 104 may also increment the number of requests 846 to one, store the time of the request 848, determine a decoding cost 874, determine a transcoding cost 866, determine a native decoding cost 868, determine a count threshold 838 and/or determine a rate threshold 840. The decoding cost 874, transcoding cost 866 and/or native decoding cost 868 may be determined by looking up values in a table that electronic device A 102 has stored. Alternatively, these costs 874, 866, 868 may be determined by retrieving cost estimates from earlier decodings/transcodings or by decoding/transcoding a sample amount of data.

Each time the agent 104 detects a media file 820 request, it may increment the number of requests 846. The agent 104 may also determine whether the media file 820 should be saved as a native format media file 110. For example, the agent 104 may determine whether the number of requests 846 is greater than or equal to the count threshold 838 or whether the request rate is greater than or equal to the rate threshold 840. Alternatively, the agent may use media file information 836 such as number of requests 846, request times 848, file size 870, file format 872, decoding cost 874, transcoding cost 866, native decoding cost 868, file type 876, metadata 878 and/or other information 850, etc. to determine whether saving the media file 820 as a native format media file 110 or an original format media file 111 will conserve resources with some degree of probability. It should also be noted that electronic device A 102 may compare costs for transcoding and decoding the native format media file 110 or saving and decoding the original format media file 111 to determine if one will likely conserve more resources than the other, and whether the media file 120 should be saved at all.

Figure 9:
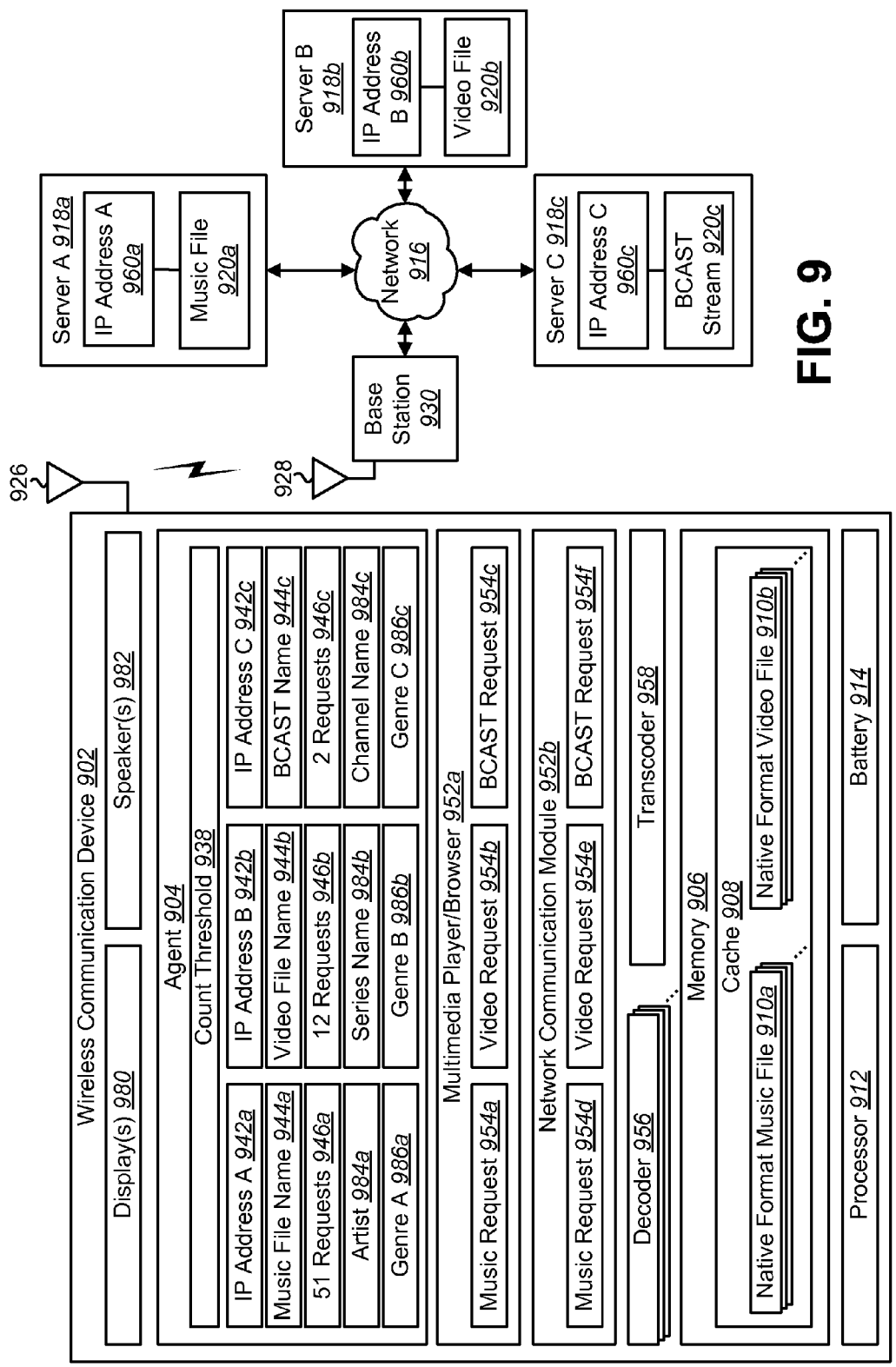
FIG. 9 is a block diagram illustrating one example of media file caching for conserving resources.

FIG. 9 is a block diagram illustrating one example of media file caching for conserving resources. In this example, a wireless communication device 902 includes one or more displays 980, one or more speakers 982, an agent 904, a multimedia player/browser 952*a*, a network communication module 952*b*, one or more decoders 956, a transcoder 958, memory 906, a processor 912, a battery 914 and one or more antennas 926. The wireless communication device 902 communicates with a base station 930. For example, the wireless communication device 902 transmits electromagnetic signals to the base station 930 and receives electromagnetic signals from the base station 930 using one or more antennas 926. The base station 930 receives the electromagnetic signals from the wireless communication device 902 and transmits electromagnetic signals to the wireless communication device 902 using one or more antennas 928. The base station 930 communicates with server A 918*a*, server B 918*b* and server C 918*c* using a network 916. In this example, server A 918*a* includes a music file 920*a* at IP address A 960*a*, server B 918*b* includes a video file 920*b* at IP address B 960*b* and server C 918*c* includes a BCAST stream 920*c* at IP address C 960*c*.

The wireless communication device 902 uses a multimedia player/browser 952*a* and a network communication module 952*b* to request the music file 920*a*, the video file 920*b* and the BCAST stream 920*c*. In other words, the multimedia player/browser 952*a* makes a music request 954*a*, a video request 954*b* and a BCAST stream request 954*c*. Additionally or alternatively, the network communication module 952*b* makes a music request 954*d*, a video request 954*e* and a BCAST stream request 954*f*. For example, the multimedia player/browser 952*a* may be a software module that a user uses to search for and/or request media files 920. The network communication module 952*b* may be a software and/or hardware module that formats the requests 954 for transmission to the base station 930 and over the network 916.

The agent 904 monitors the requests 954 made by the multimedia player/browser 952*a* and/or the network communication module 952*b*. When the agent 904 detects the requests 954, it 904 stores media file information. In this example, the agent 904 stores IP address A 942*a*, the music file name 944*a* and some metadata, including an artist name 984*a* and genre A 986*a*. The agent 904 also stores IP address B 942*b*, the video file name 944*b*, metadata including a series name 984*b* and genre B 986*b*. Furthermore, the agent 904 stores IP address C 942*c*, the BCAST stream name 944*c* and metadata including a channel name 984*c* and genre C 986*c*. As is further illustrated in this example, the agent 904 has tracked the number of requests 946 for each of the media files 920 requested. In this example, the music file 920*a* has had 51 requests 946*a*, the video file 920*b* has had 12 requests 946*b* and the web TV file 920*c* has had 2 requests 946*c*.

In this example, the agent 904 uses a single count threshold 938 for all media files 920. Assume that the agent 904 has determined the threshold to be 10 requests. Because the agent 904 has detected 10 or more requests for the music file 920*a* and the video file 920*b*, it 904 uses the transcoder 958 to transcode the music file 960*a* as a native format music file 910*a* and the video file 960*b* as a native format video file 910*b*, which are stored in the local memory 906 cache 908. The one or more decoders 956 are used to decode the media files 920. For example, for the first nine requests of the music file 920*a* and the video file 920*b*, the decoders 956 were used to decode the files 920*a-b* from their original format, which were then presented using the one or more displays 980 and the one or more speakers 982. From the tenth or eleventh request (depending on the configuration) and beyond, the decoders 956 are used to decode the native format music file 910*a* and the native format video file 910*b* for presentation on the display(s) 980 and speaker(s) 982.

Assume, for example, that the original format of the music file 920*a* is MP3, which costs 40 mA to decode and 100 mA to transcode to native format. Further assume that the native format music file 910*a* costs 5 mA to decode. Thus, in the example illustrated, decoding the native format music file 910*a* has conserved 40 mA*(51−9)−5 mA*(51−9)−100 mA=1680 mA−210 mA−100 mA=1370 mA for the battery 914.

In the example illustrated, the BCAST stream 920*c* has only had two requests 946*c*. Since two is less than the count threshold 938, the wireless communication device 902 will use a particular decoder 956 to decode the BCAST stream 920*c* in its original format for each request until the BCAST stream 920*c* has been requested 10 times, at which point it 902 may transcode and/or store the BCAST stream 920*c* in the memory 906 for subsequent requests 954.

Figure 10:
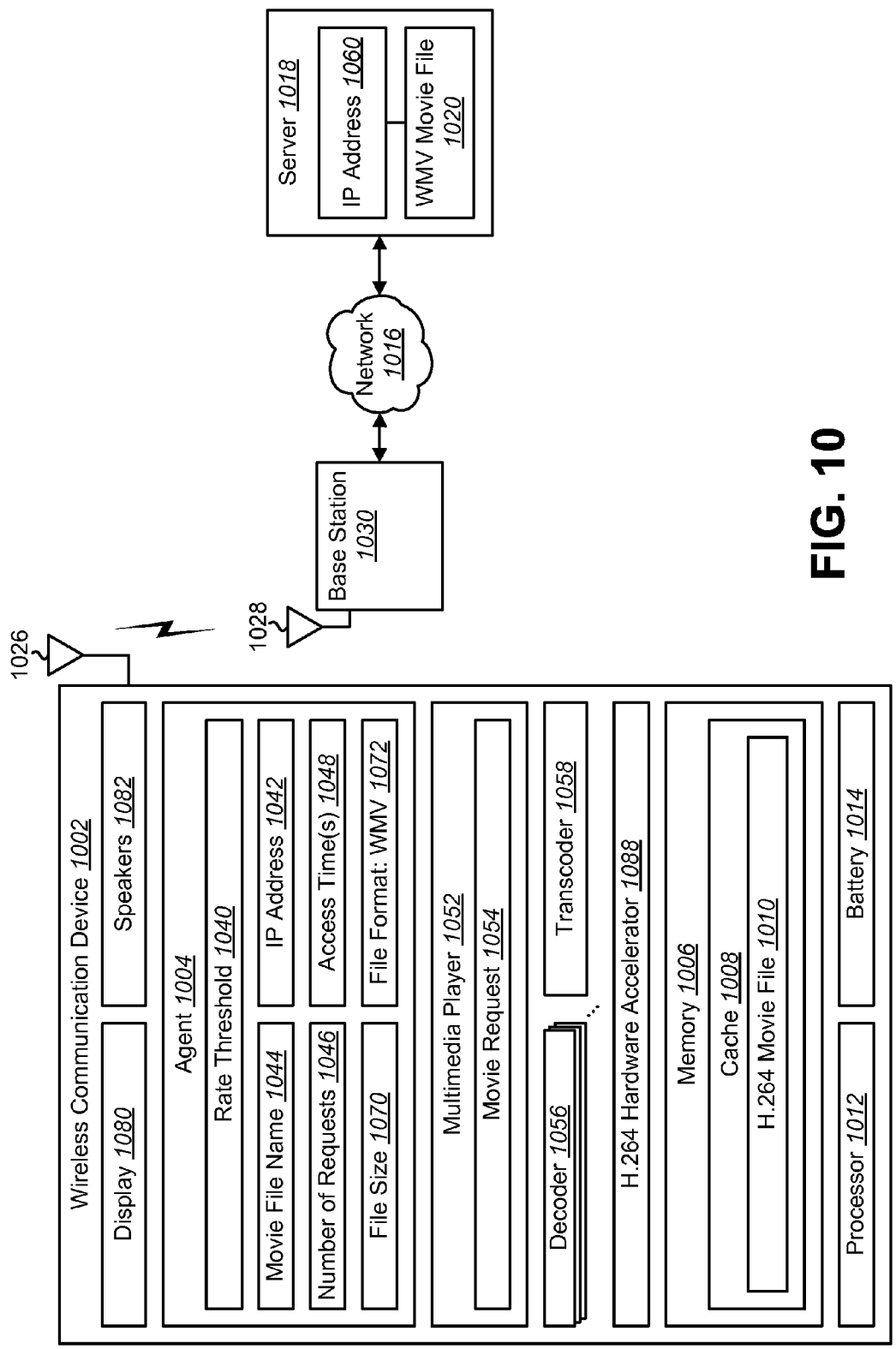
FIG. 10 is a block diagram illustrating another example of media file caching for conserving resources.

FIG. 10 is a block diagram illustrating another example of media file caching for conserving resources. In this example, the wireless communication device 1002 includes a display 1080, speakers 1082, an agent 1004, a multimedia player 1052, one or more decoders 1056, a transcoder 1058, an H.264 hardware accelerator 1088, memory 1006, a processor 1012, a battery 1014 and an antenna 1026. The wireless communication device 1002 and the base station 1030 communicate with each other by transmitting and receiving signals using antennas 1026, 1028. The base station 1030 communicates with a server 1018 using a network 1016. The server 1018 stores and/or provides a WMV format movie file 1020 at an IP address 1060.

In this example, the agent 1004 uses a rate threshold 1040. In one configuration, the rate threshold 1040 is a threshold within a window of time. One example of such a rate threshold 1040 would be three requests within any hour window. In another configuration, the rate threshold 1040 is an average rate threshold measured from the first media file 120 request. Assume, for example, that the rate threshold 1040 is three requests in any 24-hour window. The agent 1004 monitors the multimedia player 1052 and detects a movie request 1054 for WMV movie file 1020 at 3:00 pm. On the first access, the agent stores the movie file name 1044, the IP address 1042, the number of requests 1046 (e.g., as one), the access time 1048 (e.g., as 3:00 pm for the current date), the file size 1070 and the file format 1072 (e.g., as WMV). The wireless communication device 1002 uses a decoder 1056 to decode the movie file 1020 in its original WMV format, which it 1002 then presents using the display 1080 and speakers 1082. The agent 1004 continues monitoring the multimedia player 1052 for media file 120 requests. At 7:00 pm, the multimedia player 1052 again requests the WMV movie file 1020. The agent 1004 detects this request and increments the number of requests 1046 to two and stores an additional access time 1048 of 7:00 pm for the current date. Again, the WMV movie file 1020 is decoded using a decoder 1056 in its original WMV format. The next morning, the agent 1004 detects yet another request for the WMV movie file 1020. The agent 1004 increments the number of requests to three 1046 and stores an additional access time 1048 of 10:00 am for the date following the initial access request. The agent 1004 determines that the rate of requests for the WMV movie file 1020 is greater than or equal to the rate threshold 1040 of three requests in any 24-hour period. Thus, the agent 1004 determines that the WMV movie file 1020 should be saved in a native format.

In this example, the agent 1004 determines that H.264 is the video format that will likely offer the greatest battery power conservation (e.g., the lowest total transcoding and/or decoding power cost over a likely number of subsequent requests). This may be due in part to the fact that the wireless communication device 1002 includes an H.264 hardware accelerator 1088 that allows it 1002 to efficiently decode and/or present H.264 video files.

In one configuration, the wireless communication device 1002 decodes and presents the WMV movie file 1020 using the same WMV decoder 1056 and then transcodes the WMV movie file 1020 into an H.264 movie file 1010 during or after decoding. The H.264 movie file 1010 is stored in the local memory 1006 cache 1008. In another configuration, the wireless communication device 1002 transcodes the WMV movie file 1020 into the H.264 movie file 1010 first, and then uses an H.264 decoder 1056 and/or H.264 hardware accelerator 1088 to decode and present the H.264 movie file 1010 using the display 1080 and speakers 1082. The H.264 movie file 1010 may then be decoded and presented using a decoder 1056 and/or the H.264 hardware accelerator 1088 for subsequent requests.

Figure 11:
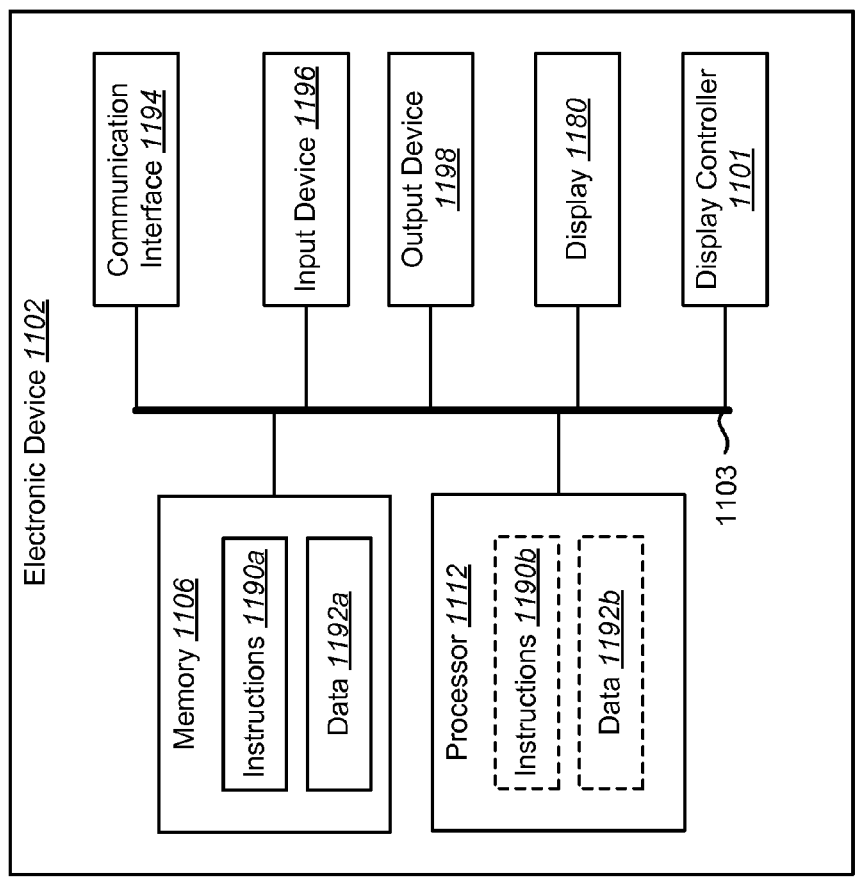
FIG. 11 illustrates various components that may be utilized in an electronic device.

FIG. 11 illustrates various components that may be utilized in an electronic device 1102. The illustrated components may be located within the same physical structure or in separate housings or structures. The electronic devices 102, 118, 202, 218, 224, 318, 324, 602, 618 discussed in relation to FIGS. 1, 2, 3 and 6 may be configured similarly to the electronic device 1102. The electronic device 1102 includes a processor 1112. The processor 1112 may be a general purpose single- or multi-chip microprocessor (e.g., an ARM), a special purpose microprocessor (e.g., a digital signal processor (DSP)), a microcontroller, a programmable gate array, etc. The processor 1112 may be referred to as a central processing unit (CPU). Although just a single processor 1112 is shown in the electronic device 1102 of FIG. 11, in an alternative configuration, a combination of processors (e.g., an ARM and DSP) could be used.

The electronic device 1102 also includes memory 1106 in electronic communication with the processor 1112. That is, the processor 1112 can read information from and/or write information to the memory 1106. The memory 1106 may be any electronic component capable of storing electronic information. The memory 1106 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1192a and instructions 1190a may be stored in the memory 1106. The instructions 1190a may include one or more programs, routines, sub-routines, functions, procedures, etc. The instructions 1190a may include a single computer-readable statement or many computer-readable statements. The instructions 1190a may be executable by the processor 1112 to implement the methods 400, 500 that were described above. Executing the instructions 1190a may involve the use of the data 1192a that is stored in the memory 1106. FIG. 11 shows some instructions 1190b and data 1192b being loaded into the processor 1112.

The electronic device 1102 may also include one or more communication interfaces 1194 for communicating with other electronic devices. The communication interfaces 1194 may be based on wired communication technology, wireless communication technology, or both. Examples of different types of communication interfaces 1194 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1102 may also include one or more input devices 1196 and one or more output devices 1198. Examples of different kinds of input devices 1196 include a keyboard, mouse, microphone, remote control device, button, joystick, trackball, touchpad, lightpen, etc. Examples of different kinds of output devices 1198 include a speaker, printer, etc. One specific type of output device which may be typically included in an electronic device 1102 is a display device 1180. Display devices 1180 used with configurations disclosed herein may utilize any suitable image projection technology, such as a cathode ray tube (CRT), liquid crystal display (LCD), light-emitting diode (LED), gas plasma, electroluminescence, or the like. A display controller 1101 may also be provided, for converting data stored in the memory 1106 into text, graphics, and/or moving images (as appropriate) shown on the display device 1180.

The various components of the electronic device 1102 may be coupled together by one or more buses, which may include a power bus, a control signal bus, a status signal bus, a data bus, etc. For simplicity, the various buses are illustrated in FIG. 11 as a bus system 1103. It should be noted that FIG. 11 illustrates only one possible configuration of an electronic device 1102. Various other architectures and components may be utilized.

Figure 12:
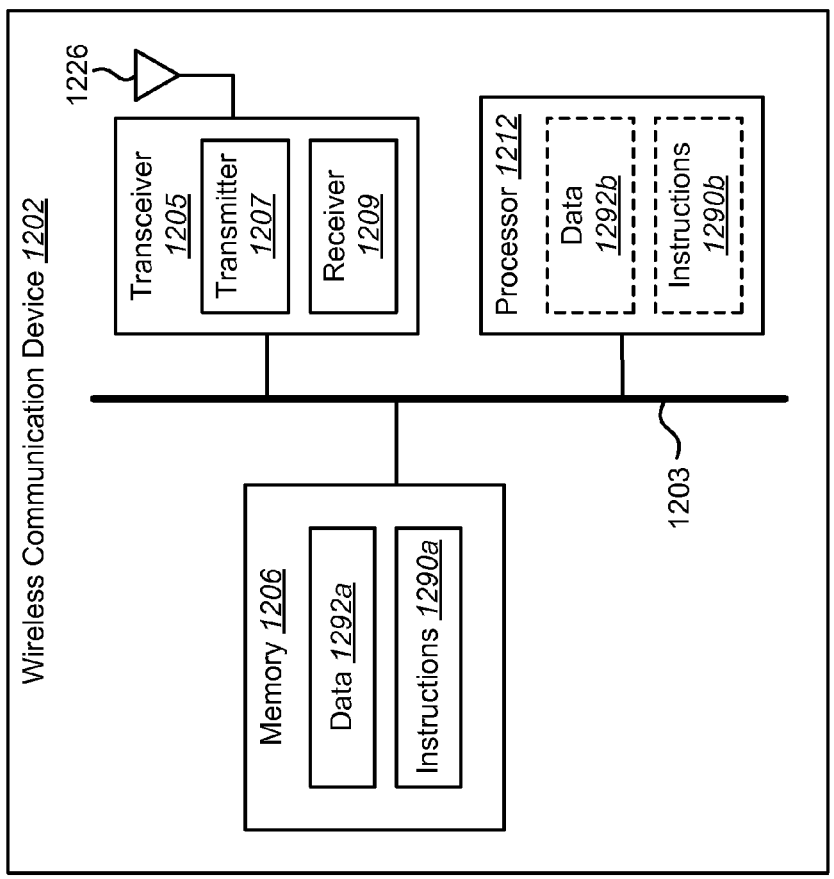
FIG. 12 illustrates certain components that may be included within a wireless communication device.

FIG. 12 illustrates certain components that may be included within a wireless communication device 1202. The wireless communication devices 302, 902, 1002, described in relation to FIGS. 3, 9 and 10 may be configured similarly to the wireless communication device 1202 that is shown in FIG. 12. The wireless communication device 1202 includes a processor 1212. The processor 1212 may be a general purpose single- or multi-chip microprocessor (e.g., an ARM), a special purpose microprocessor (e.g., a digital signal processor (DSP)), a microcontroller, a programmable gate array, etc. The processor 1212 may be referred to as a central processing unit (CPU). Although just a single processor 1212 is shown in the wireless communication device 1202 of FIG. 12, in an alternative configuration, a combination of processors (e.g., an ARM and DSP) could be used.

The wireless communication device 1202 also includes memory 1206 in electronic communication with the processor 1212 (i.e., the processor 1212 can read information from and/or write information to the memory 1206). The memory 1206 may be any electronic component capable of storing electronic information. The memory 1206 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1292*a* and instructions 1290*a* may be stored in the memory 1206. The instructions 1290*a* may include one or more programs, routines, sub-routines, functions, procedures, etc. The instructions 1290*a* may include a single computer-readable statement or many computer-readable statements. The instructions 1290*a* may be executable by the processor 1212 to implement the methods 400, 500 that were described above. Executing the instructions 1290*a* may involve the use of the data 1292*a* that is stored in the memory 1206. FIG. 12 shows some instructions 1290*b* and data 1292*b* being loaded into the processor 1212.

The wireless communication device 1202 may also include a transmitter 1207 and a receiver 1209 to allow transmission and reception of signals between the wireless communication device 1202 and a remote location (e.g., a base station or other wireless communication device). The transmitter 1207 and receiver 1209 may be collectively referred to as a transceiver 1205. An antenna 1226 may be electrically coupled to the transceiver 1205. The wireless communication device 1202 may also include (not shown) multiple transmitters, multiple receivers, multiple transceivers and/or multiple antenna.

The various components of the wireless communication device 1202 may be coupled together by one or more buses, which may include a power bus, a control signal bus, a status signal bus, a data bus, etc. For simplicity, the various buses are illustrated in FIG. 12 as a bus system 1203.

Figure 13:
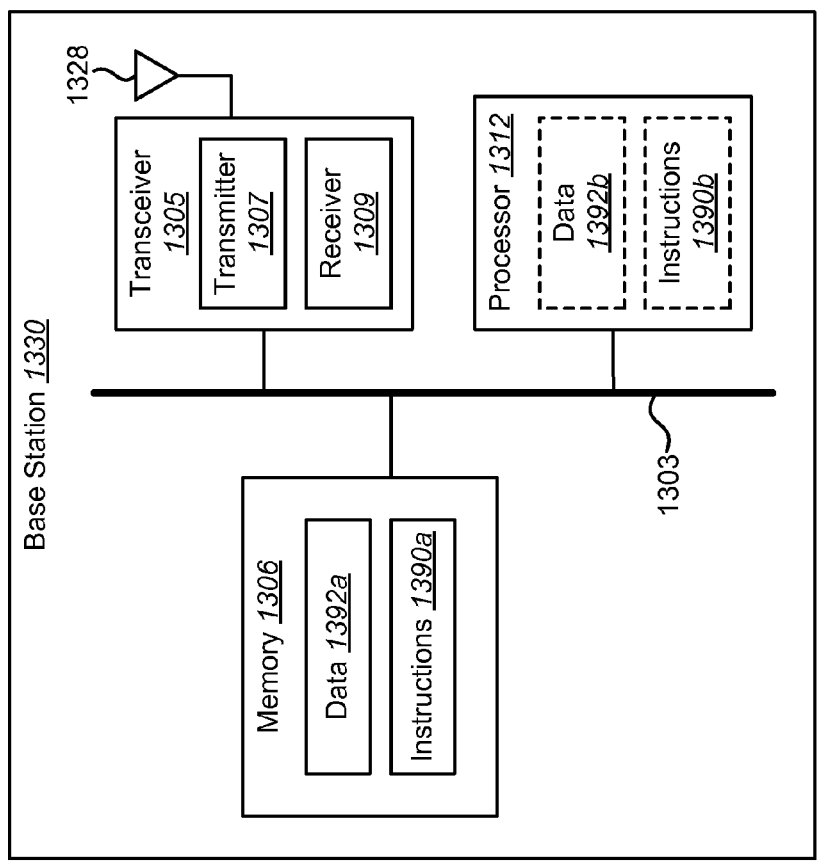
FIG. 13 illustrates certain components that may be included within a base station.

FIG. 13 illustrates certain components that may be included within a base station 1330. The base stations 330, 930, 1030 discussed previously in relation to FIGS. 3, 9 and 10 may be configured similarly to the base station 1330 shown in FIG. 13. The base station 1330 includes a processor 1312. The processor 1312 may be a general purpose single- or multi-chip microprocessor (e.g., an ARM), a special purpose microprocessor (e.g., a digital signal processor (DSP)), a microcontroller, a programmable gate array, etc. The processor 1312 may be referred to as a central processing unit (CPU). Although just a single processor 1312 is shown in the base station 1330 of FIG. 13, in an alternative configuration, a combination of processors (e.g., an ARM and DSP) could be used.

The base station 1330 also includes memory 1306 in electronic communication with the processor 1312 (i.e., the processor 1312 can read information from and/or write information to the memory 1306). The memory 1306 may be any electronic component capable of storing electronic information. The memory 1306 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1392*a* and instructions 1390*a* may be stored in the memory 1306. The instructions 1390*a* may include one or more programs, routines, sub-routines, functions, procedures, etc. The instructions 1390*a* may include a single computer-readable statement or many computer-readable statements. The instructions 1390*a* may be executable by the processor 1312 to implement the methods 400, 500 disclosed herein. Executing the instructions 1390*a* may involve the use of the data 1392*a* that is stored in the memory 1306. FIG. 13 shows some instructions 1390*b* and data 1392*b* being loaded into the processor 1312.

The base station 1330 may also include a transmitter 1307 and a receiver 1309 to allow transmission and reception of signals between the base station 1330 and a remote location (e.g., a wireless communication device). The transmitter 1307 and receiver 1309 may be collectively referred to as a transceiver 1305. An antenna 1328 may be electrically coupled to the transceiver 1305. The base station 1330 may also include (not shown) multiple transmitters, multiple receivers, multiple transceivers and/or multiple antenna.

The various components of the base station 1330 may be coupled together by one or more buses, which may include a power bus, a control signal bus, a status signal bus, a data bus, etc. For simplicity, the various buses are illustrated in FIG. 13 as a bus system 1303.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for media file caching for conserving resources, comprising:
   a processor;
   memory in electronic communication with the processor;
   instructions stored in the memory, the instructions being executable to:
      monitor requests for a media file;
      store media file information, wherein the media file information comprises a count threshold of requests originating at the electronic device and one or more of an amount of processing power and an amount of power resources needed to decode the media file for presentation on the electronic device;
      determine whether the media file should be stored locally based on the media file information, and if it is determined that the media file should be stored, then:
         save the media file in a native format; and
         present the media file.

2. The electronic device of claim 1, wherein determining whether the media file should be stored locally is based on a number of requests.

3. The electronic device of claim 1, wherein determining whether the media file should be stored locally is based on an original format decoding cost.

4. The electronic device of claim 1, wherein determining whether the media file should be stored locally is based on a native format decoding cost.

5. The electronic device of claim 1, wherein determining whether the media file should be stored locally is based on a transcoding cost.

6. The electronic device of claim 1, wherein the instructions are further executable to:
   detect subsequent requests for the media file; and
   present the media file in the native format when subsequent requests for the media file are detected.

7. The electronic device of claim 1, wherein the media file is saved in local memory on the electronic device.

8. The electronic device of claim 1, wherein the media file is saved in local memory on another electronic device in a local network.

9. The electronic device of claim 1, wherein saving the media file comprises transcoding the media file from an original format into the native format.

10. The electronic device of claim 1, wherein the instructions are further executable to determine the count threshold.

11. The electronic device of claim 1, wherein the media file should be stored if a request count is greater than or equal to the count threshold.

12. The electronic device of claim 1, wherein the media file should be stored if a request rate is greater than or equal to a rate threshold.

13. The electronic device of claim 1, wherein the media file comprises one or more media streams.

14. The electronic device of claim 1, wherein the electronic device is a wireless communication device.

15. The electronic device of claim 1, wherein the media file is presented in the native format.

16. The electronic device of claim 1, wherein the media file is presented in an original format.

17. A method for media file caching for conserving resources on an electronic device, comprising:
   monitoring requests for a media file;
   storing, by an electronic device, media file information, wherein the media file information comprises a count threshold of requests originating at the electronic device and one or more of an amount of processing power and an amount of power resources needed to decode the media file for presentation on the electronic device;
   determining, on the electronic device, whether the media file should be stored locally based on the media file information, and if it is determined that the media file should be stored, then:
      saving the media file in a native format by the electronic device; and
   presenting the media file on the electronic device.

18. The method of claim 17, wherein determining whether the media file should be stored locally is based on a number of requests.

19. The method of claim 17, wherein determining whether the media file should be stored locally is based on an original format decoding cost.

20. The method of claim 17, wherein determining whether the media file should be stored locally is based on a native format decoding cost.

21. The method of claim 17, wherein determining whether the media file should be stored locally is based on a transcoding cost.

22. The method of claim 17, further comprising:
detecting subsequent requests for the media file; and
presenting the media file in the native format when subsequent requests for the media file are detected.

23. The method of claim 17, wherein the media file is saved in local memory on the electronic device.

24. The method of claim 17, wherein the media file is saved in local memory on another electronic device in a local network.

25. The method of claim 17, wherein saving the media file comprises transcoding the media file from an original format into the native format.

26. The method of claim 17, further comprising determining the count threshold.

27. The method of claim 17, wherein the media file should be stored if a request count is greater than or equal to the count threshold.

28. The method of claim 17, wherein the media file should be stored if a request rate is greater than or equal to a rate threshold.

29. The method of claim 17, wherein the media file comprises one or more media streams.

30. The method of claim 17, wherein the electronic device is a wireless communication device.

31. The method of claim 17, wherein the media file is presented in the native format.

32. The method of claim 17, wherein the media file is presented in an original format.

33. A computer-program product for media file caching for conserving resources, the computer-program product comprising a non-transitory computer-readable medium having instructions thereon, the instructions comprising:
code for causing an electronic device to monitor requests for a media file;
code for causing the electronic device to store media file information, wherein the media file information comprises a count threshold of requests originating at the electronic device and one or more of an amount of processing power and an amount of power resources needed to decode the media file for presentation on the electronic device;
code for causing the electronic device to determine whether the media file should be stored locally based on the media file information and if it is determined that the media file should be stored, then:
saving the media file in a native format; and
presenting the media file.

34. The computer-program product of claim 33, wherein determining whether the media file should be stored locally is based on a number of requests.

35. The computer-program product of claim 33, wherein determining whether the media file should be stored locally is based on an original format decoding cost.

36. The computer-program product of claim 33, wherein determining whether the media file should be stored locally is based on a native format decoding cost.

37. The computer-program product of claim 33, wherein determining whether the media file should be stored locally is based on a transcoding cost.

38. The computer-program product of claim 33, the instructions further comprising:
code for causing the electronic device to detect subsequent requests for the media file; and
code for causing the electronic device to present the media file in the native format when subsequent requests for the media file are detected.

39. An apparatus for media file caching for conserving resources, comprising:
means for monitoring requests for a media file;
means for storing media file information, wherein the media file information comprises a count threshold of requests originating at the apparatus and one or more of an amount of processing power and an amount of power resources needed to decode the media file for presentation on the electronic device;
means for determining whether the media file should be stored locally based on the media file information and if it is determined that the media file should be stored, then:
saving the media file in a native format; and
presenting the media file.

40. The apparatus of claim 39, wherein determining whether the media file should be stored locally is based on a number of requests.

41. The apparatus of claim 39, wherein determining whether the media file should be stored locally is based on an original format decoding cost.

42. The apparatus of claim 39, wherein determining whether the media file should be stored locally is based on a native format decoding cost.

43. The apparatus of claim 39, wherein determining whether the media file should be stored locally is based on a transcoding cost.

44. The apparatus of claim 39, further comprising:
means for detecting subsequent requests for the media file; and
means for presenting the media file in the native format when subsequent requests for the media file are detected.

* * * * *